United States Patent [19]

Watanabe

[11] Patent Number: 5,798,853
[45] Date of Patent: *Aug. 25, 1998

[54] OPTICAL COMMUNICATION SYSTEM COMPENSATING FOR CHROMATIC DISPERSION AND PHASE CONJUGATE LIGHT GENERATOR FOR USE THEREWITH

[75] Inventor: Shigeki Watanabe, Kawasaki, Japan

[73] Assignee: Fujitsu, Limited, Kawasaki, Japan

[*] Notice: The term of this patent shall not extend beyond the expiration date of Pat. No. 5,596,667.

[21] Appl. No.: 766,052

[22] Filed: Dec. 16, 1996

Related U.S. Application Data

[63] Continuation of Ser. No. 638,535, Apr. 26, 1996, abandoned, which is a continuation of Ser. No. 468,183, Jun. 6, 1995, abandoned, which is a continuation of Ser. No. 135,626, Oct. 14, 1993, abandoned.

[30] Foreign Application Priority Data

| | | | |
|---|---|---|---|
| Oct. 16, 1992 | [JP] | Japan | 4-278662 |
| Apr. 30, 1993 | [JP] | Japan | 5-104120 |
| Sep. 7, 1993 | [JP] | Japan | 5-221856 |

[51] Int. Cl.$^6$ .............. H04B 10/00; H01S 3/10; G02F 1/29
[52] U.S. Cl. .............. 359/160; 372/21; 359/300; 359/61
[58] Field of Search .............. 385/1, 5, 122; 359/326, 300, 238, 240, 160, 161; 372/21

[56] References Cited

U.S. PATENT DOCUMENTS

| | | | |
|---|---|---|---|
| 4,344,042 | 8/1982 | Hon | 330/4.3 |
| 4,528,464 | 7/1985 | Chemla et al. | 307/425 |
| 4,529,273 | 7/1985 | Cronin-Golomb et al. | 350/354 |

(List continued on next page.)

FOREIGN PATENT DOCUMENTS

| | | | |
|---|---|---|---|
| 500357 | 2/1992 | European Pat. Off. | 359/160 |
| 75731 | 3/1991 | Japan | 359/300 |
| 3-171787 | 7/1991 | Japan . | |
| 4-191709 | 7/1992 | Japan . | |
| 4-263228 | 9/1992 | Japan . | |
| 1474577 | 4/1989 | U.S.S.R. | 359/300 |

OTHER PUBLICATIONS

R.I. Laming et al., Transmission of 6 ps linear pulses over 50 km of standard fibre using midpoint spectral inversion to eliminate dispersion, *Proc. ECOC '93*, 1993, Paper WeC8.2, pp. 345–348.

S. Ogita, Y. Kotaki, M. Matsuda, Y. Kuwahara, H. Onaka, H. Miyata, and H. Ishikawa, "FM response of narrow-linewidth, multielectrode λ/4 shift DFB laser," *IEEE Photon. Technol. Lett.*, vol. 2, pp. 165–166, 1990.

(List continued on next page.)

*Primary Examiner*—Hezrone E. Williams
*Assistant Examiner*—Richard A. Moller
*Attorney, Agent, or Firm*—Staas & Halsey

[57] ABSTRACT

An optical communication system compensating for chromatic dispersion and a phase conjugate light generator for use therewith. The system includes an optical transmitter which receives an input signal and transmits signal light over an optical transmission line which is then input to a phase conjugate light generation unit. The phase conjugate light generation unit generates phase conjugate light corresponding to the signal light and outputs the phase conjugate light to an optical receiver which reproduces a demodulated signal corresponding to the input signal. The system compensates for chromatic dispersion by having the phase conjugate light generator generate phase conjugate light corresponding to signal light received over a first optical transmission line and then transmitting the generated phase conjugate light over a second optical transmission line.

50 Claims, 31 Drawing Sheets

U.S. PATENT DOCUMENTS

| | | | |
|---|---|---|---|
| 4,769,820 | 9/1988 | Holmes | 372/33 |
| 4,778,261 | 10/1988 | Boyd et al. | 359/300 |
| 4,803,429 | 2/1989 | Kyuma et al. | 324/244 |
| 4,972,156 | 11/1990 | Gregor et al. | 330/4.3 |
| 5,025,488 | 6/1991 | Yeh et al. | 455/619 |
| 5,038,359 | 8/1991 | Pepper et al. | 372/99 |
| 5,170,268 | 12/1992 | Ewbank et al. | 359/7 |
| 5,243,610 | 9/1993 | Murata | 372/21 |
| 5,291,326 | 3/1994 | Heidemann | 359/160 |
| 5,295,013 | 3/1994 | Ono | 359/192 |
| 5,596,667 | 1/1997 | Watanabe | 385/122 |

OTHER PUBLICATIONS

K. Inoue, T. Hasegawa, K. Oda, and H. Toba, "Multichannel frequency conversion experiment using fiber four–wave mixing," *Electronics Letters*, Sep. 1993, vol. 29, No. 19, pp. 1708–1710.

K. Kikuchi, IEEE and Chaloemphon Lorattanasane, "Compensation for Pulse Waveform Distortion in Ultra–Long Distance Optical Communication Systems by using Midway Optical Phase Conjugator," *IEEE Photonics Technology Letters*, vol. 6, No. 1, Jan. 1994, pp. 104–105.

R.M. Jopson, A.H. Gnauck, and R.M. Derosier, "10–Gb/s 360–km transmission over normal–dispersion fiber using mid–system spectral inversion," *Proc. OFC '93*, San Jose, CA 1993, Paper PD3–1 to PD3–4, pp. 283–286.

Shigeki Watanabe, "Compensation of Chromatic Dispersion in a Single–Mode Fiber by Optical Phase Conjugation," *IEEE Photonics Technology Letters*, 5:1, pp. 92–95, 1993.

A.H. Gnauck, C.R. Giles, L.J. Cimini, Jr. J. Stone, L.W. Stulz, S.K. Korotky and J.J. Veselka, "8–Gb/s–130 km transmission experiment using Er–doped fiber preamplifier and optical dispersion equalization," *IEEE Photon. Technol. Lett.*, vol. 3, pp. 1147–1149, 1991.

C. Kurtzke and A. Gnauck, "How to increase capacity beyond 200Tbit/s km without solitons," in *Proc. ECOC '93*, 1993, Paper ThC 12.12, pp. 45–48.

M.C. Tatham, G. Sherlock, and L.D. Westbrook, "Compensation of fiber chromatic dispersion by mid–way spectral inversion in a semiconductor laser amplifier," in *Proc. ECOC '93*, 1993, Paper ThP12.3, pp. 61–64.

Watanabe et al., "Generation of Optical Phase–Conjugate Waves and Compensation for Pulse Shape Distortion", vol. 12, *J. Lightwave Tech.*, p. 2145 (1994).

Watanabe et al., "Exact Compensation for Both Chromatic Dispersion and Kerr Effect in a Transmission Fiber Using Optical Phase Conjugation", *Journal of Lightwave Technology*, 14:3, pp. 243–248, 1996.

Watanabe et al., "Compensation for Chromatic Dispersion and Self–Phase Modulation in a Transmission Fiber by Optical Phase Conjugation", *Fujitsu Sci. Tech. J.*, 30:2, pp. 181–187, 1984.

Watanabe et al., "Compensation of Pulse Shape Distortion Due to Chromatic Dispersion and Kerr Effect by Optical Phase Conjugation", vol. 5, *IEEE Photonics Technology Letters*, pp. 1241–1243, 1993.

Watanabe et al., "Highly efficient conversion and parametric gain of nondegenerate forward four–wave mixing in a singlemode fibre", *Electronics Letters*, 30:2, pp. 163–164, 1994.

Watanabe et al., "Cancellation of four–wave mixing in multichannel fibre transmission by midway optical phase conjugation", *Electronics Letters*, 30:14, pp. 1156–1157, 1994.

Shigeki Watanabe, "Cancellation of four–wave mixing in a single–mode fiber by midway, optical phase conjugation", *Optics Letters*, 19:17, pp. 1308–1310, 1994.

Watanabe et al., "Generation of Optical Phase–Conjugate Waves and Compensation for Pulse Shape Distortion in a Single–Mode Fiber", *Journal of Lightwave Technology*, 12:12, pp. 2139–2146 (1994).

Shigeki Watanabe, "Compensation of the phase fluctuation in a transmission line by optical phase conjugation", *Optics Letters*, 17:19, pp. 1355–1357, 1992.

Yariv et al., "Compensation for channel dispersion by non–linear optical phase conjugation", *Optics Letters*, 4:2, pp. 52–54, 1979.

Amnon Yariv, "Phase Conjugate Optics and Real–Time Holography", *IEEE Journal of Quantum Electronics*, 14:9, pp. 650–660, 1978.

Watanabe et al., "20 Gb/s Fiber Transmission Experiment over 3000 km by Waveform Pre–Compensation using Fiber Compensator and Optical Phase Conjugator", *PD2–6 IOOC–95*, pp. 31–32.

Shigeki Watanabe, "Optical Fiber Transmission using Phase Conjugation", *FD1–3 IOOC–95*, pp. 94–95.

A.F. Elrefaie, R.E. Wagner, D.A. Atlas, and D. G. Daut, "Chromatic dispersion limitations in coherent optical fiber transmission systems," *Electron. Lett.*, vol. 23, pp. 756–758, 1987.

T.L. Koch and R.C. Alferness, "Dispersion compensation by active predistorted signal synthesis," *J. Lightwave Technol.*, vol. LT–3, pp. 800–805, 1985.

A.M. Vengsarkar and W.A. Reed, "Dispersion–compensating single–mode fibers: Efficient designs for first–and second–order compensation." *Opt. Lett.*, vol. 18, pp. 924–926, 1993.

K. Inoue, "Four–wave mixing in an optical fiber in the zero–dispersion wavelength region." *J. Lightwave Technol.*, vol. LT–10, pp. 1553–1561, 1992.

D. Cotter, "Stimulated Brillouin scattering in monomode optical fiber." *J. Opt. Commun.*, vol. 4, pp. 10–19, 1983.

D.M. Pepper and A. Yariv, "Compensation for phase distortions in nonlinear media by phase conjugation," *Opt. Lett.*, vol. 5, pp. 59–60, 1980.

D.A.B. Miller, D.S. Chemla, D.J. Eisenberger, P.W. Smith, A.C. Gossard, and W.T. Tsang, "Large room–temperature optical nonlinearity in $GaAs/Ga_{1-x}Al_xAS$ multiple quantum well structures," *Appl. Phys. Lett.*, vol. 41, pp. 679–681, 1982.

M. Asobe, H. Kobayashi, H. Itoh, and T. Kanamori, "Laser–diode–driven ultrafast all–optical switching by using highly nonlinear chalcogenide glass fiber," *Opt. Lett.*, vol. 18, pp. 1056–1058, 1993.

J.P. Gordon and H.A. Haus, "Random walk of coherently amplified solitons in optical fiber transmission," *Opt. Lett.*, vol. 11, pp. 665–667, 1986.

S. Murata, A. Tomita, J. Shimizu, and A. Suzuki, "THz optical–frequency conversion of 1 Gb/s–signals using highly nondegenerate four–wave mixing in an InGaAsP semiconductor laser," *IEEE Photon. Technol. Lett.*, vol. 3, pp. 1021–1023, 1991.

N. Takachio, K. Iwashita, K. Nakanishi, and S. Koike, Chromatic dispersion equalization in an 8 Gbit/s 202 km optical CPFSK transmission experiment,: n Proc. 100C '89, Kobe, Japan, 1989, Paper 20PDA–13.

T. Kiyonaga, Y. Onoda, T. Naito, T. Chikama, H. Kuwahara, Fujitsu Laboratories, Ltd. and M. Makiuchi, "Broadband balanced receiver using a twin PIN/HEMT front end and a glass waveguide coupler in a 4–Gbits CP–FSK system." *Proc. CLEO '90*, 1990, Paper CWD3.

Signal light pulses

Pump light pulses

Phase conjugate light pulses

Signal light pulses

Pump light pulses

Phase conjugate light pulses

Transmitted signal light pulses

Repeater-received signal light pulses

Pump light pulses

Phase conjugate light pulses

Transmitted signal
light pulses

Repeater-received
signal light pulses

Pump light pulses

Phase conjugate
light pulses

Interference noise — ASE noise

ASE noise

Transmitted signal light pulses

Repeater received signal light pulses

Pump light pulses

Phase conjugate light pulses

Output constant pulses

OPTICAL COMMUNICATION SYSTEM COMPENSATING FOR CHROMATIC DISPERSION AND PHASE CONJUGATE LIGHT GENERATOR FOR USE THEREWITH

This application is a continuation of application Ser. No. 08/638,535, filed Apr. 26, 1996, now abandoned, which is a continuation of application Ser. No. 08/468,183, filed Jun. 6, 1995, now abandoned, which is a continuation of application Ser. No. 08/136,626, filed Oct. 14, 1993, now abandoned.

BACKGROUND OF THE INVENTION

1. Field of the Invention

The present invention relates to an optical communication system based on phase conjugate optics. More particularly, the invention relates to an optical communication system that compensates for chromatic dispersion as well as to a conjugate light generator for use with that system.

2. Description of the Related Art

Prior art optical communication systems are typically constituted by optical components having linear optical characteristics. In that sense, these systems are simple in constitution but are limited in their characteristics and functions. Recent years have seen the development of non-repeated systems or optically amplified repeater systems covering hundreds and even thousands of kilometers of transmission distances while offering transmission speeds of as high as several to tens of Gb/s. Also under development are analog optical transmission systems equipped with optical modulators of extremely good linearity. For these systems, the adverse effects of chromatic dispersion on optical transmission lines are one of the most serious problems to be dealt with. The chromatic dispersion over optical transmission lines deteriorates transmission characteristics and ultimately limits the feasible distance of transmission. It is for these reasons that optical communication systems compensating for chromatic dispersion are desired.

One conventional way to counter chromatic dispersion is to minimize the dispersion of optical fibers used for optical transmission lines. Illustratively, efforts in this respect have led to the development of optical fibers practically achieving zero dispersion in a wavelength band of 1.3 and/or 1.55 µm. As another solution to this problem, those systems are contemplated which minimize the chirping (dynamic wavelength variation) of the signal light to be transmitted from a transmission light source modulated externally using an optical modulator, the light source not being modulated directly. The so-called Mach-Zehnder interferometer is being developed as an optical modulator providing excellent modulation characteristics. Other possible solutions include: a system whereby transmitted signal light under-goes reverse chirping, to be offset later through chromatic dispersion over transmission lines; a system incorporating a receiver that uses a nonlinear optical filter arrangement; a system for converting optical signals to electrical signals which are later compensated for dispersion; and a system that uses a dispersion compensation fiber which has a dispersion with the opposite sign to that of the transmission fiber. These systems are considered theoretically feasible and are the targets of intensive efforts at development. The applicability of phase conjugate optics to optical communication systems is discussed illustratively in "Compensation for Channel Dispersion by Nonlinear Optical Phase Conjugation" by A. Yariv, D. Fekete and D. Pepper (Opt. Lett., Vol. 4, pp. 52–54, 1979).

SUMMARY OF THE INVENTION

It is therefore an object of the present invention to provide a novel optical communication system compensating for chromatic dispersion.

It is another object of the invention to provide a novel phase conjugate light generator for use with the optical communication system compensating for chromatic dispersion.

In carrying out the invention and according to one aspect thereof, there is provided an optical communication system comprising: a first optical transmission line for transmitting signal light; phase conjugate light generation means for receiving the signal light from the first optical transmission line and for generating the phase conjugate light corresponding to the signal light; and a second optical transmission line for receiving the phase conjugate light from the phase conjugate light generation means and for transmitting the phase conjugate light thereon; wherein the phase conjugate light generation means includes a nonlinear optical medium, a pump light source for outputting pump light, and signal light/pump light supply means for receiving the pump light from the pump light source and the signal light from the first optical transmission line, and for supplying the nonlinear optical medium with both the pump light and the signal light.

According to another aspect of the invention, there is provided a phase conjugate light generator for generating phase conjugate light corresponding to signal light supplied, the phase conjugate light generator comprising: a nonlinear optical medium; a pump light source for outputting pump light; and signal light/pump light supply means for receiving the pump light and the signal light, and for supplying the nonlinear optical medium with both the pump light and the signal light, the signal light constituting first optical pulses, the pump light constituting second optical pulses in synchronism with the first optical pulses; and drive means for driving the pump light source to output the second optical pulses.

The phase conjugate light generation means constructed as described above generates the phase conjugate light corresponding to the signal light received from the first optical transmission line, and sends the phase conjugate light over the second optical transmission line. Chromatic dispersion is compensated as a result of the time reversal characteristic of phase conjugate light. Other benefits of the invention will be described later.

In a preferred structure according to the invention, the first and the second optical transmission lines are a first and a second single mode optical fiber, respectively. With this structure, the adverse effects of the chromatic dispersion on the entire system are practically eliminated by making the chromatic dispersion in the first single mode optical fiber substantially the same as the chromatic dispersion in the second single mode optical fiber. In this manner, the compensation for chromatic dispersion is accomplished quite effectively. Even if the chromatic dispersion in the first single mode optical fiber differs from that in the second single mode optical fiber, the chromatic dispersion in the entire system is made smaller than any one of these two kinds of chromatic dispersion, whereby chromatic dispersion is compensated. The nonlinear optical medium included in the phase conjugate light generation means is formed from any one of such crystal media as $TiBaO_3$ and $LiNbO_3$, various semiconductors and optical fibers.

Where the invention is applied to optical fiber communications, the nonlinear optical medium available is the optical fiber that ensures optimum compatibility with optical transmission lines. In that case, where the wavelength of the signal light is made to differ slightly from that of the pump light so as to produce non-degenerate FWM

3

(Four Wave mixing), the wavelength allowing the optical fiber to provide zero dispersion is preferably made the same as that of the pump light. For approximations of up to second-order dispersion, the above arrangement allows the magnitude of the wave vector of the signal light to coincide substantially with the magnitude of the wave vector of the phase conjugate light (idler light). As a result, ideal phase matching is accomplished.

If the signal light is composed of optical pulses, the use of the pump light made of optical pulses in synchronism with the signal light makes it possible to output phase conjugate light composed of optical pulses of which the waveform is shaped or which are retimed. The operating principle of this arrangement will be described more specifically later.

The above and other objects, features and advantages of the present invention and the manner of realizing them will become more apparent, and the invention itself will best be understood from a study of the following description and appended claims with reference to the attached drawings showing some preferred embodiments of the invention.

4

Figure 17:
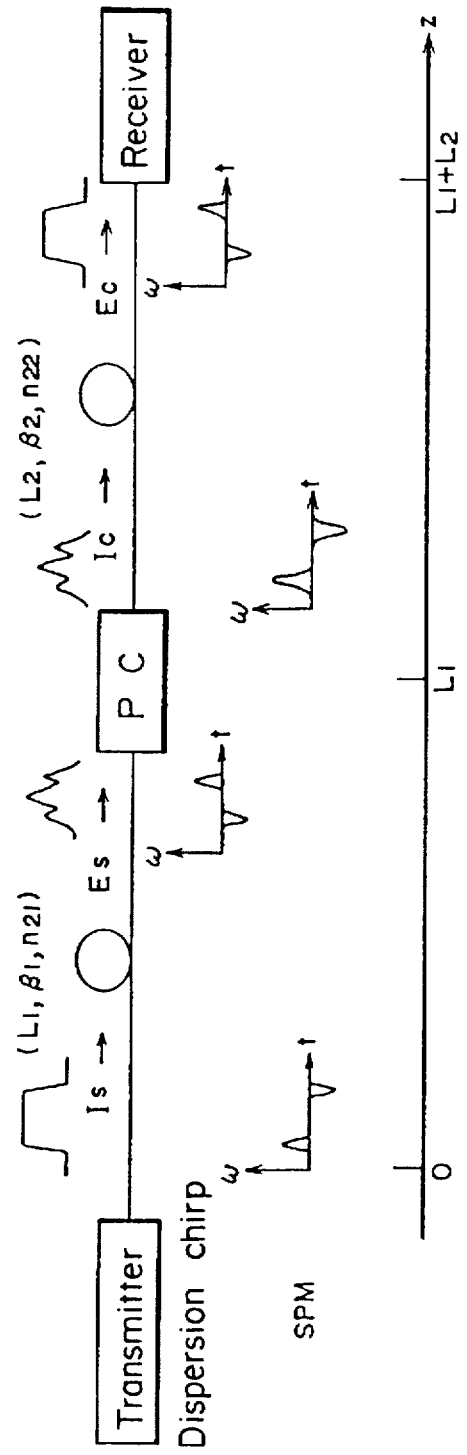
FIG. 17 is a block diagram of a system that compensates for the chromatic distortion caused by dispersion as well as for the waveform distortion caused by SPM.
Figure 18:
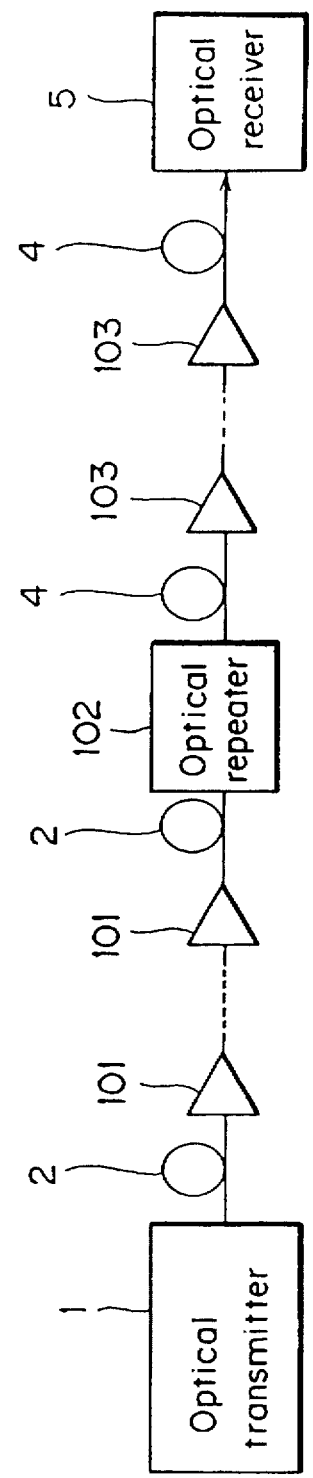
FIG. 18 is a block diagram of an optical amplifier and repeater system to which the invention is applicable.
Figure 20A:
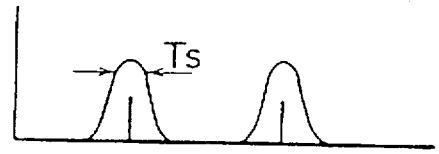
Figure 20B:
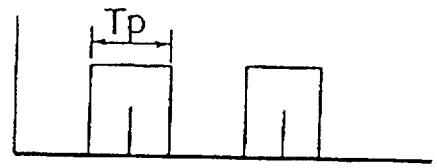
Figure 20C:
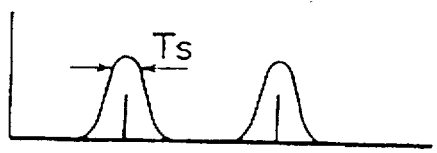
Figure 21A:
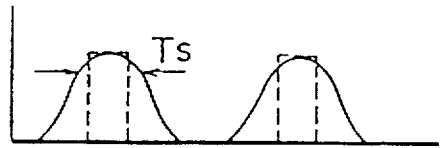
Figure 21B:
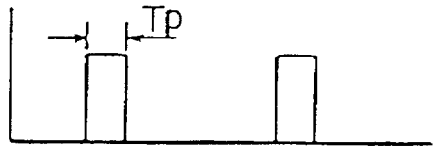
Figure 21C:
Figure 22A:
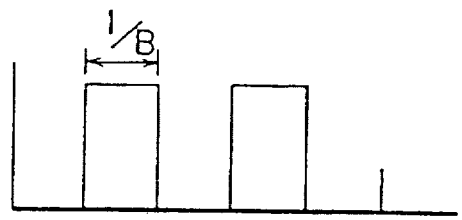
Figure 22B:
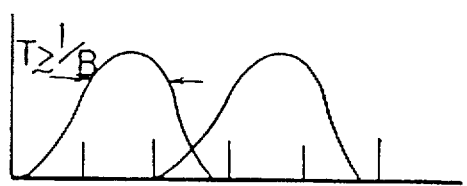
Figure 22C:
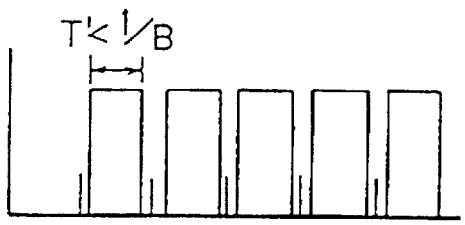
Figure 22D:
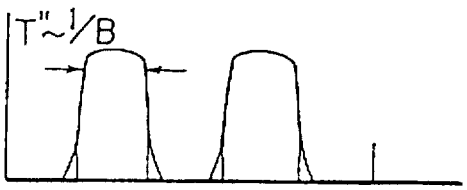
Figure 23A:
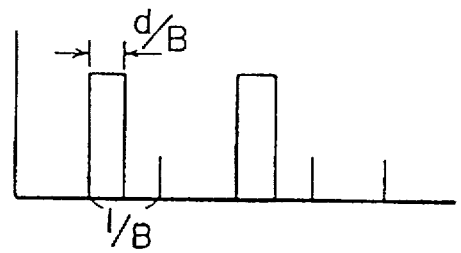
Figure 23B:
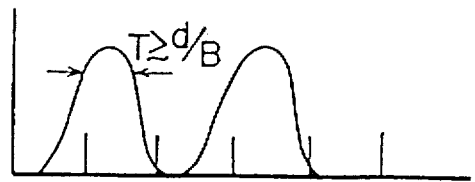
Figure 23C:
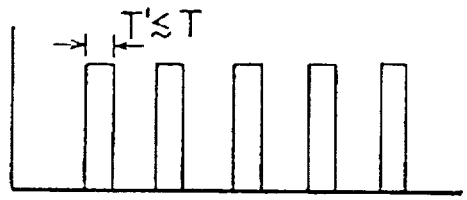
Figure 23D:
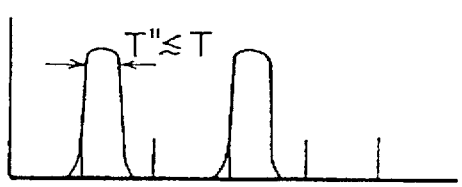
Figure 24A:
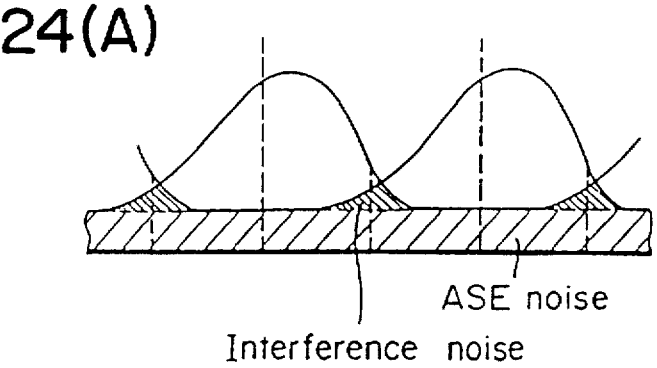
Figure 24B:
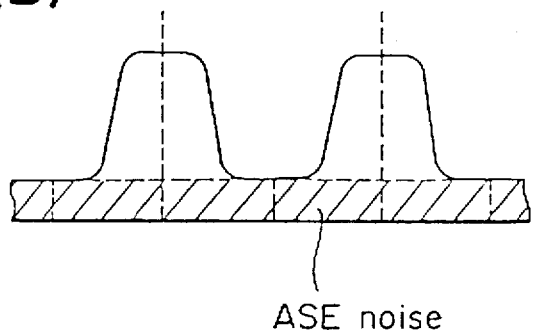
Figure 25A:
Figure 25B:
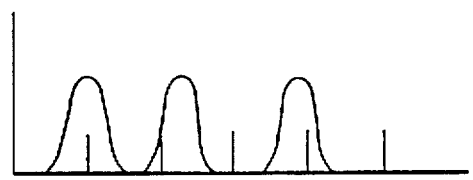
Figure 25C:
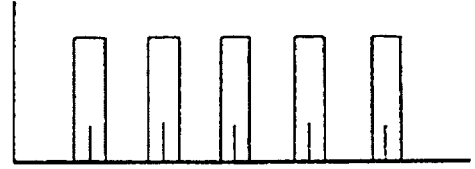
Figure 25D:
Figure 25E:
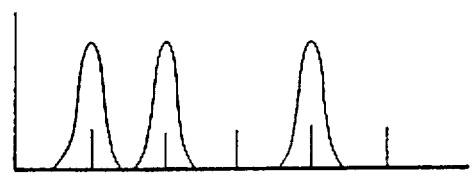
Figure 26:
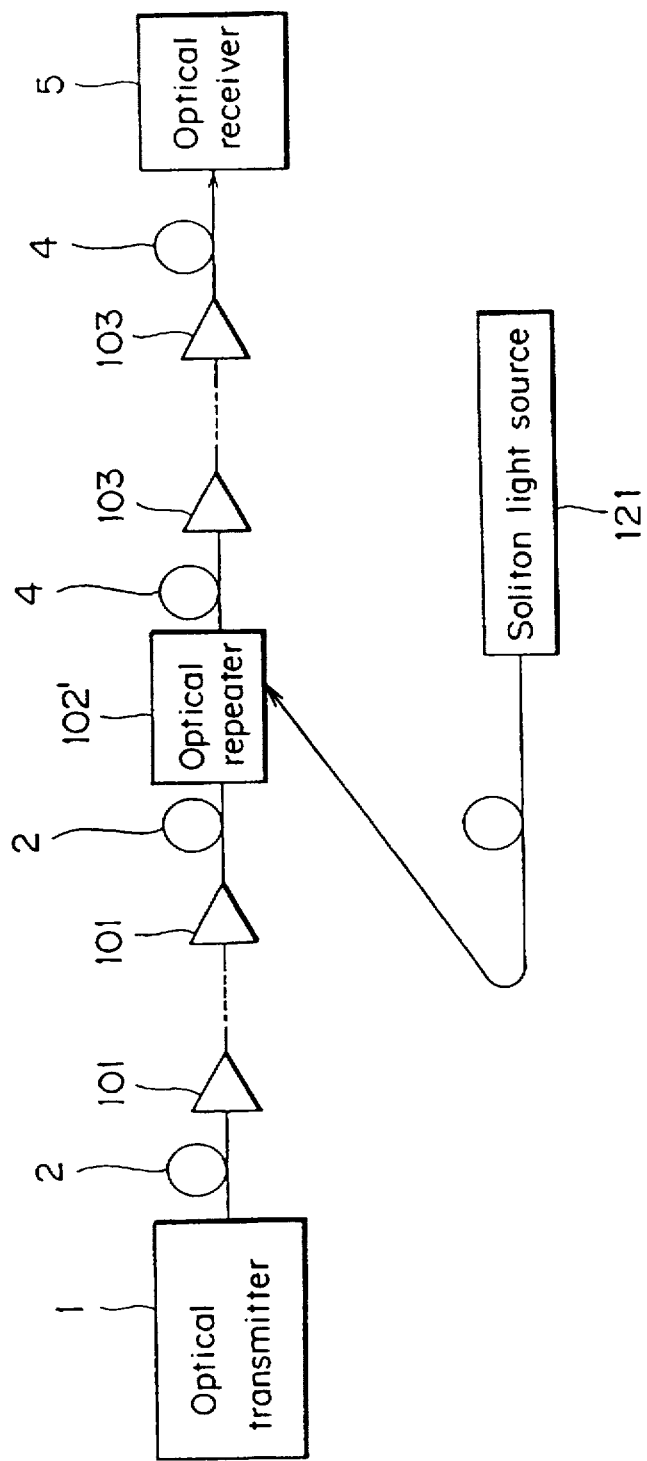
Figure 27:
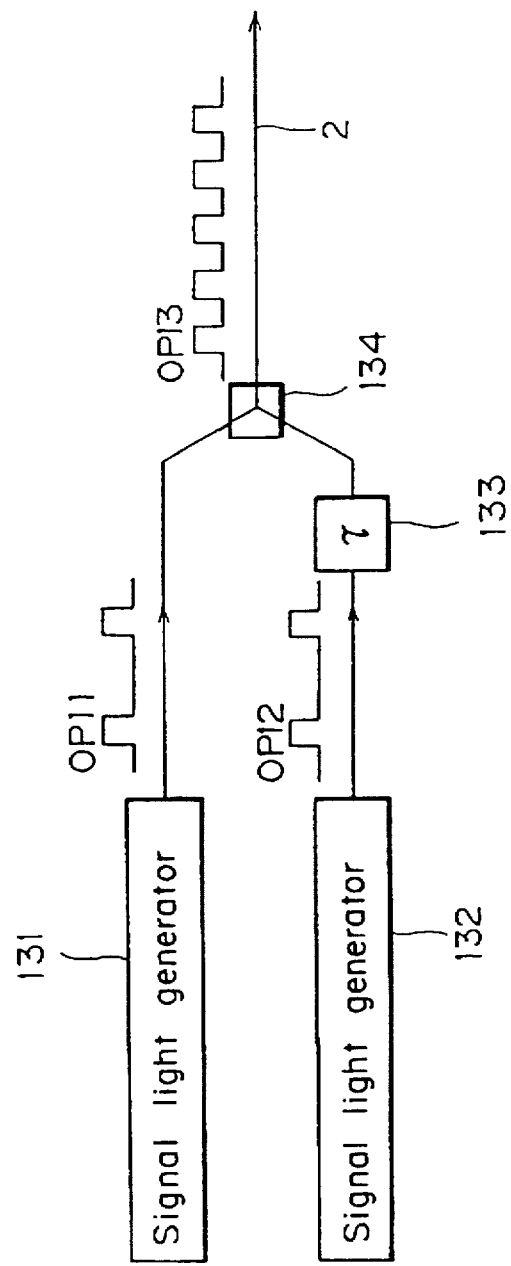
Figure 28:
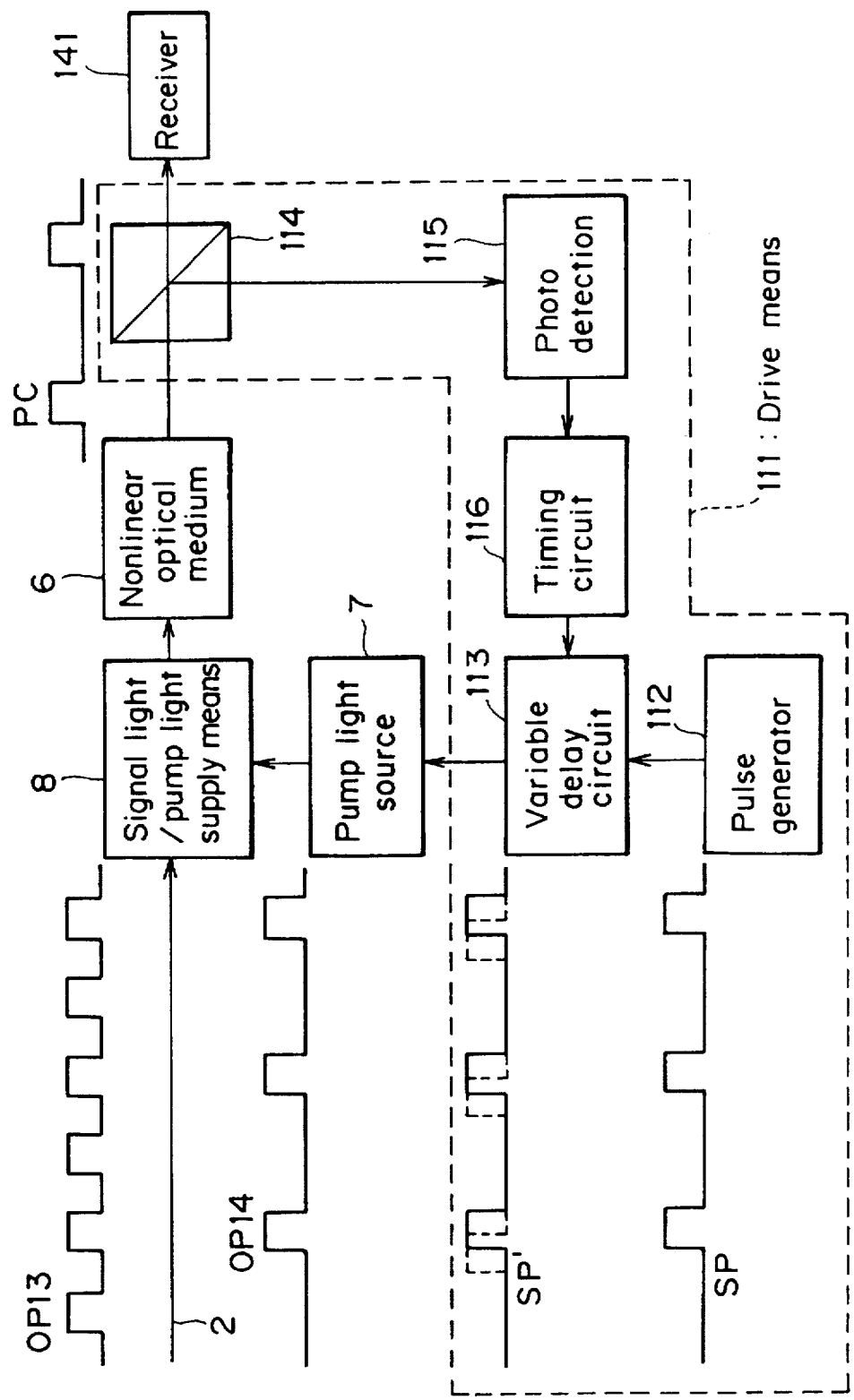
Figure 29:
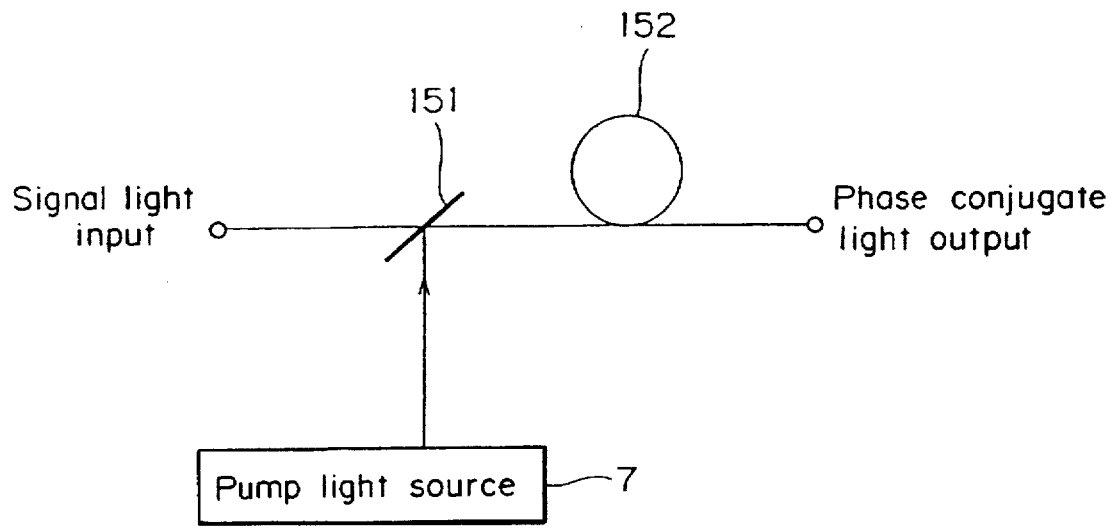
Figure 30:
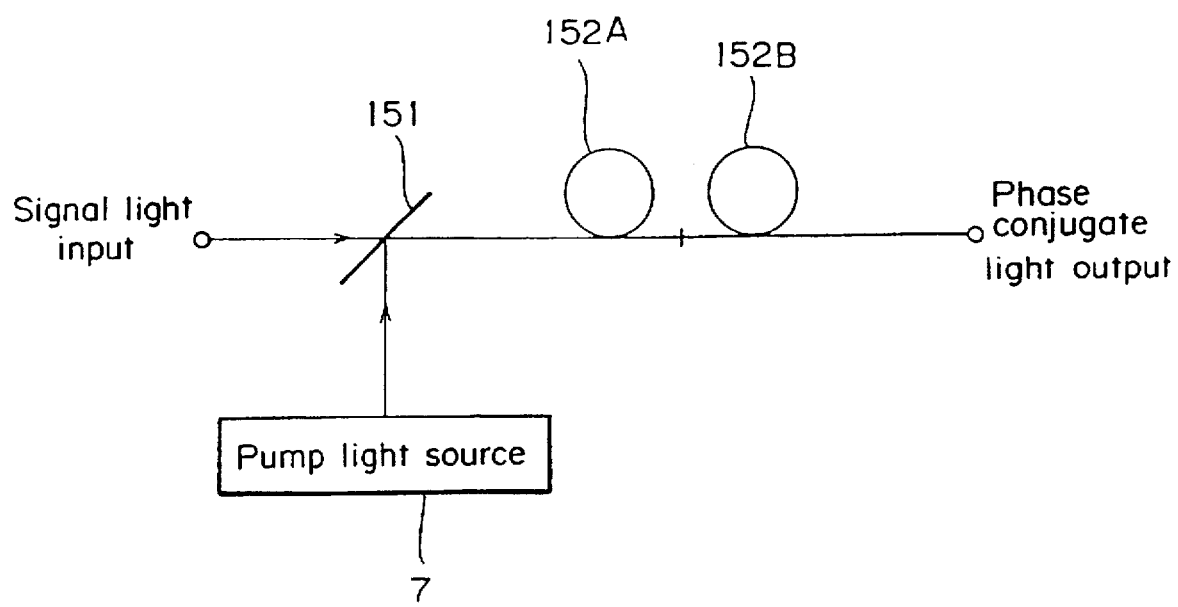
Figure 31:
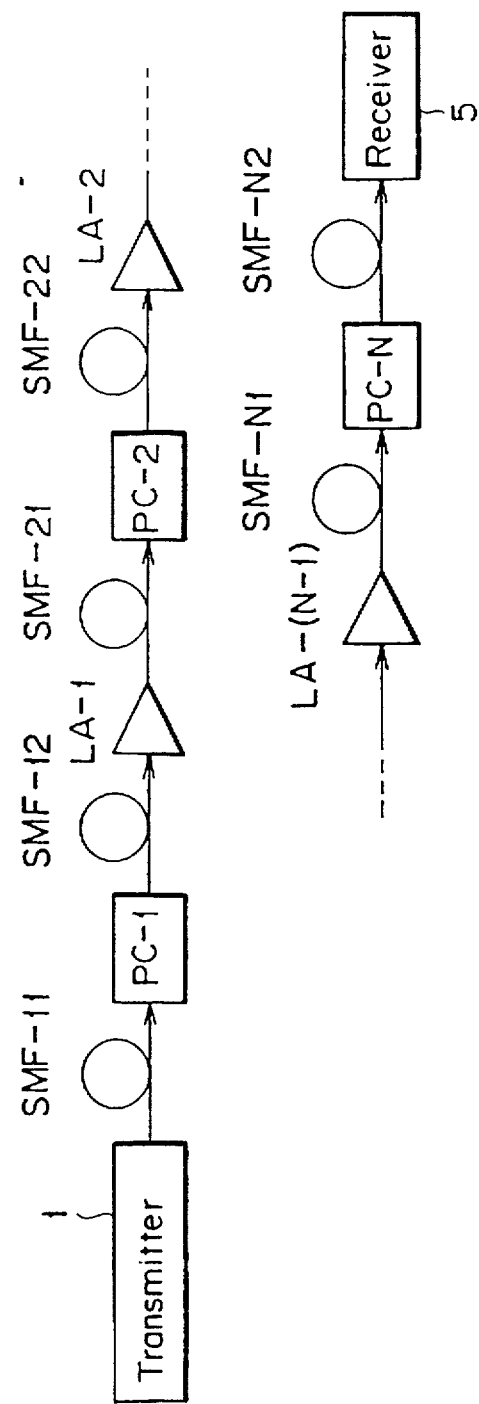
Figure 32:
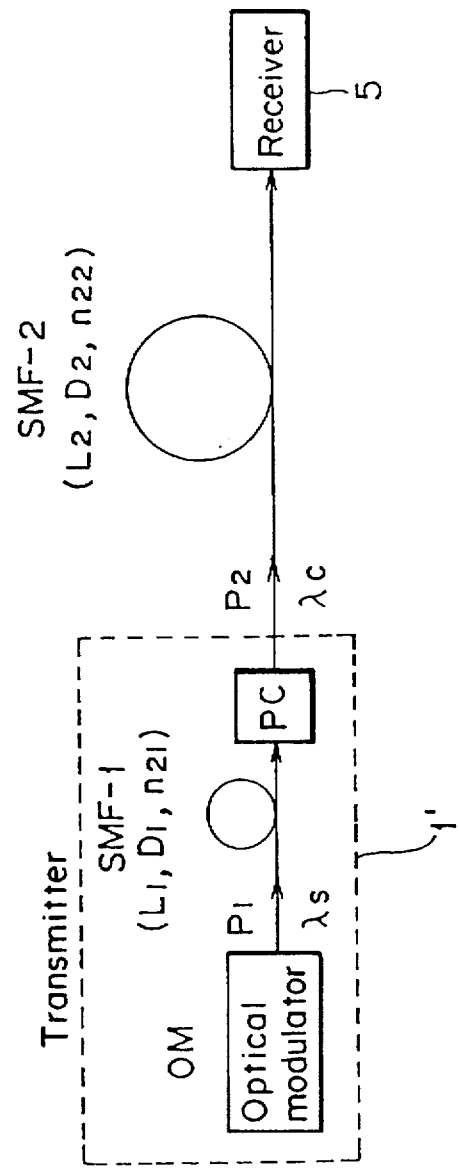
Figure 33:
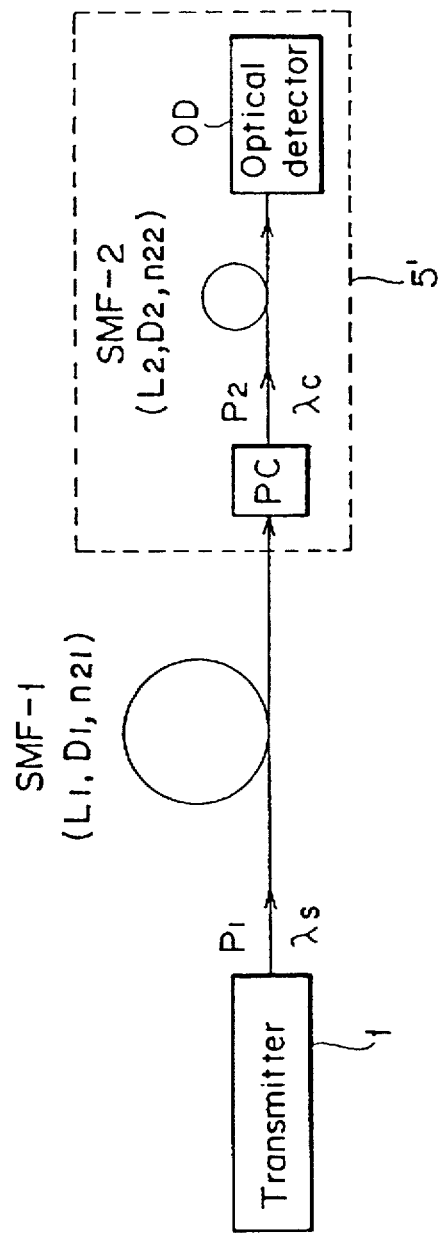
Figure 34:
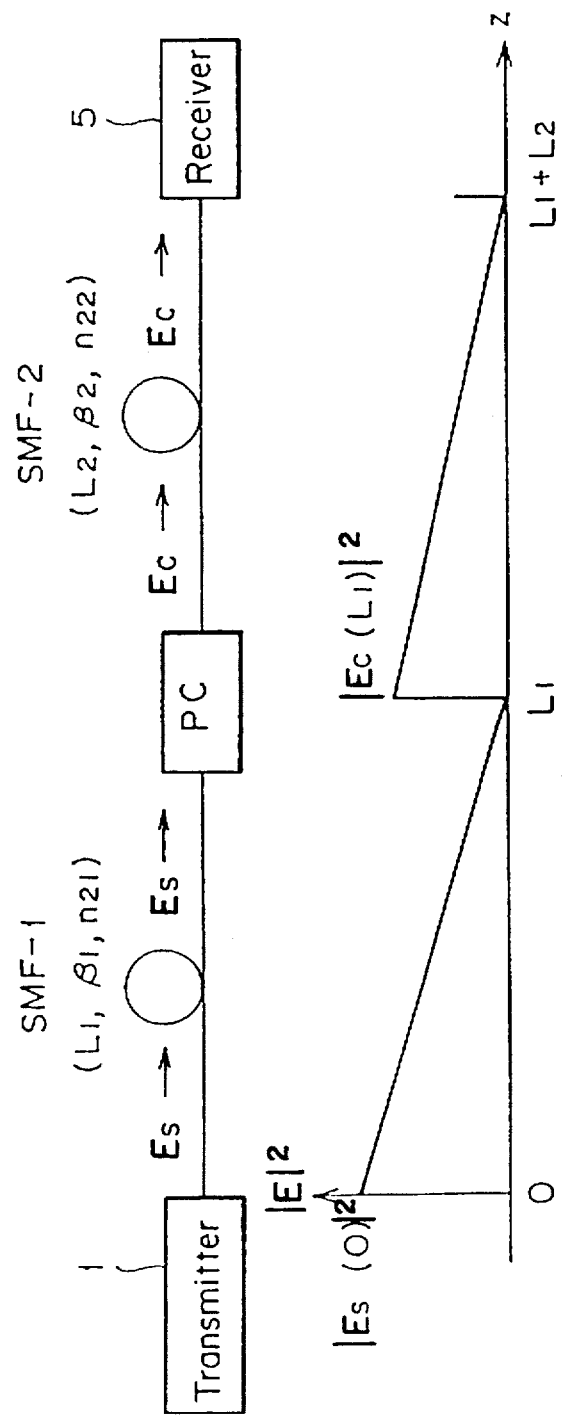
Figure 35:
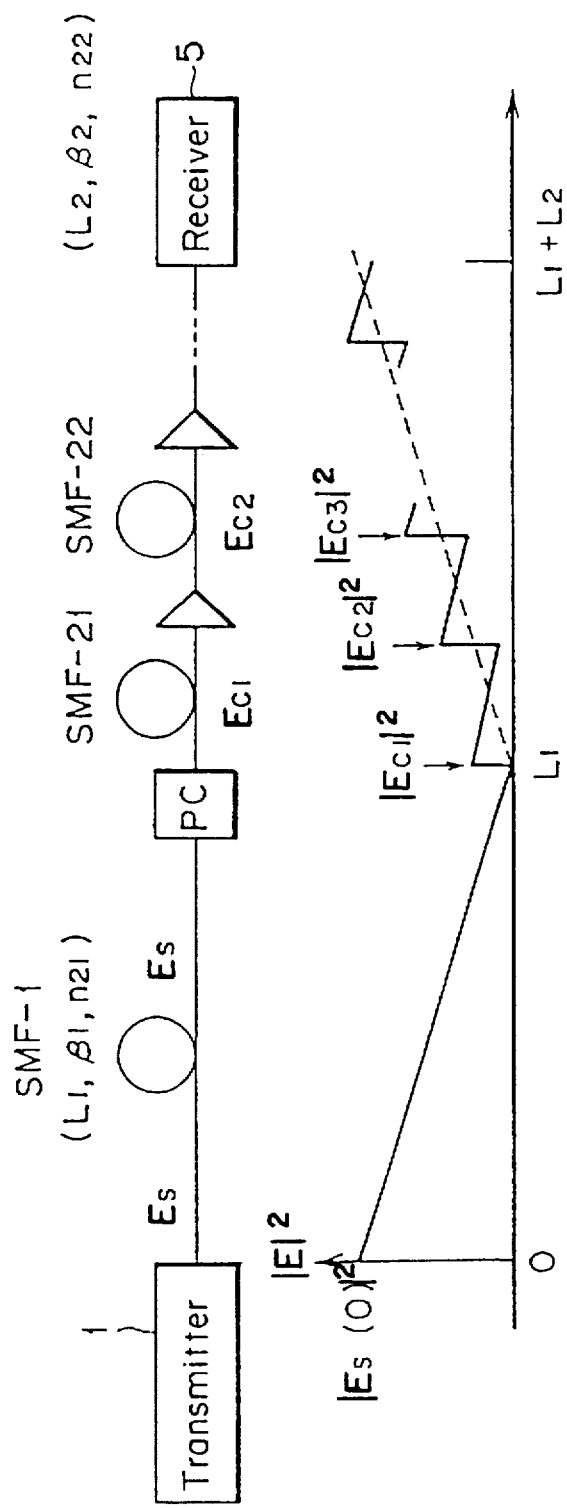

FIG. 20 is a view of waveforms in effect when the pulse width of pump light is substantially wider than that of signal light;

FIG. 21 is a view of waveforms in effect when the pulse width of pump light is narrower than that of signal light;

FIG. 22 is a view of waveforms in effect when signal light is in NRZ code;

FIG. 23 is a view of waveforms in effect when signal light is in RZ code;

FIG. 24 is a view describing typical effects of waveform shaping;

FIG. 25 is a view of waveforms in effect when signal light is composed of soliton pulses;

FIG. 26 is a block diagram of a system devised as an improvement over the system of FIG. 18, the improved system being better suited for remote control;

FIG. 27 is a block diagram of an optical transmitter suitable for high-speed transmission;

FIG. 28 is a block diagram of an optical receiver suitable for splitting TDM optical pulses;

FIG. 29 is a block diagram of an eighth embodiment of the phase conjugate light generation means;

FIG. 30 is a block diagram of a ninth embodiment of the phase conjugate light generation means;

FIG. 31 is a block diagram of a first embodiment of the system in FIG. 17;

FIG. 32 is a block diagram of a second embodiment of the system in FIG. 17;

FIG. 33 is a block diagram of a third embodiment of the system in FIG. 17;

FIG. 34 is a block diagram of a fourth embodiment of the system in FIG. 17;

FIG. 35 is a block diagram of a fifth embodiment of the system in FIG. 17; and

Figure 36:
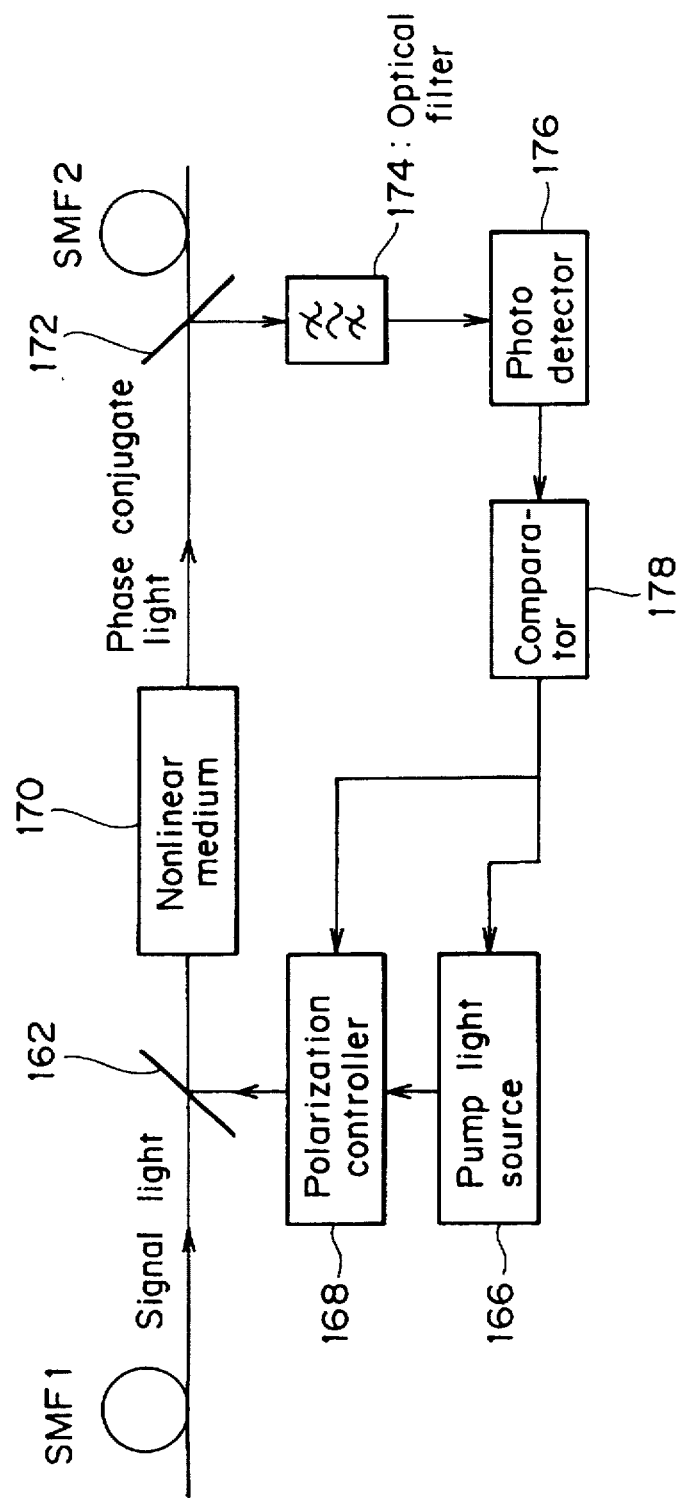

FIG. 36 is a block diagram of an example to which the active control of polarized states is applied.

DESCRIPTION OF THE PREFERRED EMBODIMENTS

Figure 1:
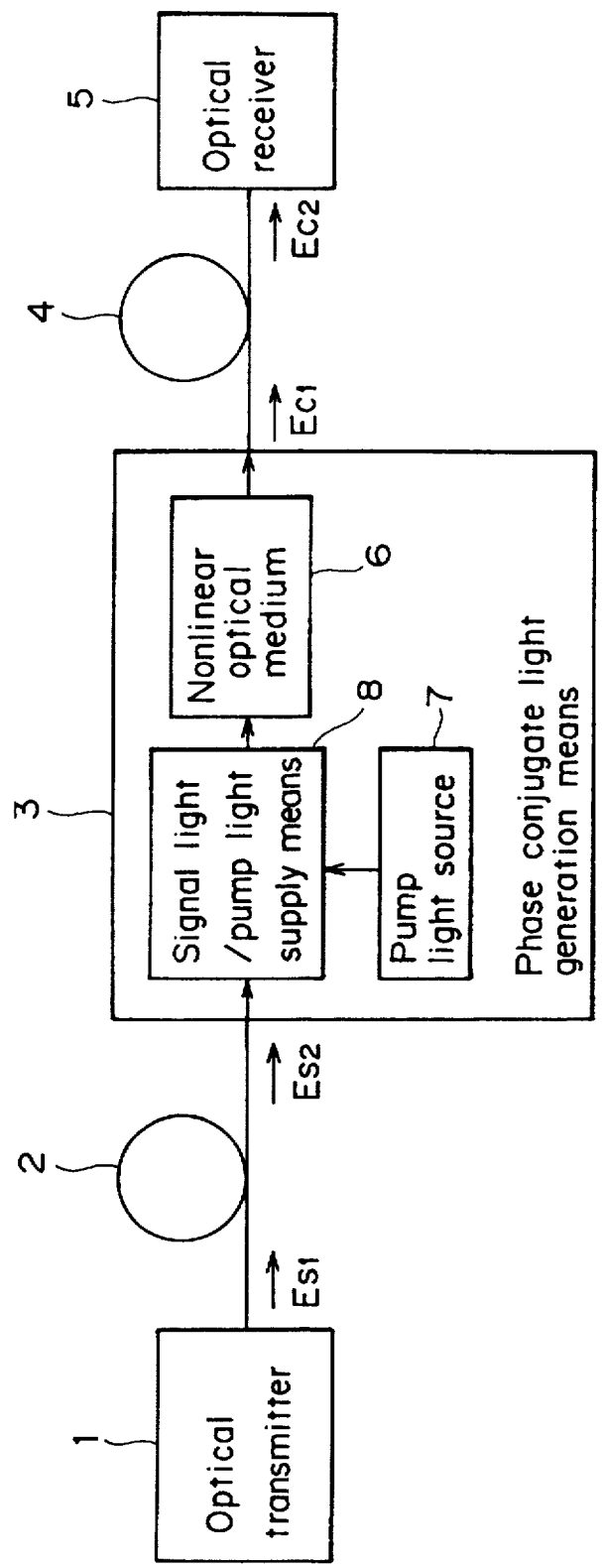
FIG. 1 is a block diagram showing a basic constitution of the present invention.

Preferred embodiments of the invention will now be described with reference to the accompanying drawings. FIG. 1 is a block diagram showing a basic constitution of an optical communication system according to the present invention. In FIG. 1, an optical transmitter 1 modulates an input signal into signal light and transmits the signal light over an optical transmission line 2. The mode of modulation here is intensity modulation for dealing with coherent or incoherent light, or amplitude or angular modulation for coherent light. The signal light transmitted over the optical transmission line 2 is fed to phase conjugate light generation means 3. Upon receipt of the signal light, the phase conjugate light generation means 3 generates phase conjugate light corresponding to the signal light. An optical transmission line 4 conveys the phase conjugate light generated by the phase conjugate light generation means 3 up to an optical receiver 5. Given the phase conjugate light, the optical receiver 5 reproduces a demodulated signal corresponding to the input signal that was fed to the optical transmitter 1. If the optical transmitter 1 adopts intensity modulation, direction detection is suitable for the optical receiver 5. If the optical transmitter 1 employs amplitude or angular modulation for addressing coherent light, the optical receiver 5 preferably adopts heterodyne or homodyne detection using a photo detector such as a photo diode together with local light. The phase conjugate light generation means 3 includes a nonlinear optical medium 6, a pump light source 7 for outputting pump light, and signal light/pump light supply means 8 for supplying the nonlinear optical medium 6 with both the pump light from the pump light source 7 and the signal light from the optical transmission line 2. The nonlinear optical medium 6 provides second- or third-order nonlinear optical effects. If it manifests third order optical effects, the nonlinear optical medium 6 generates phase conjugate light through degenerate or non-degenerate FWM. The optical transmission lines 2 and 4 are illustratively made of quartz optical fibers. In this case, chromatic dispersion in the lines is compensated by implementing the present invention. Where the chromatic dispersion occurring in the optical transmission line 2 is substantially the same as that in the optical transmission line 4, the compensation for the dispersion is accomplished effectively by having recourse to the invention. Furthermore, if the optical transmission lines 2 and 4 are single mode optical fibers with practically no mode dispersion, chromatic dispersion compensation based on the invention is quite effective.

Phase conjugate light will now be described. Suppose that a probe beam (equivalent to unmodulated signal light) progressing in a +z direction is furnished as a plane wave according to the following expression:

$$E_s(r,t) = (\tfrac{1}{2}) A_s(r) \exp[i(\omega_s t - k_s z)] + c.c. \tag{1}$$

where, $A_s(r)$ stands for the complex amplitude of the electric field, r for a space coordinate vector, $\omega_s$ for the (angular) frequency of the probe beam, t for the time, and $k_s$ for the magnitude of the wave vector. "c.c." means that the complex conjugate of the immediately preceding term is to be taken. The amplitude of the wave vector $k_s$ is given as $$k_s = \omega_s n / c$$

where, n denotes the refractive index of the optical path and c the light velocity in a vacuum. At this time, the phase conjugate light of the beam defined by Expression (1) is given by the following expressions (2A) and (2B):

$$E_c(r,t) = (\tfrac{1}{2}) A_s^*(r) \exp[i(\omega_s t + k_s z)] + c.c. \tag{2A}$$

$$E_c(r,t) = (\tfrac{1}{2}) A_s^*(r) \exp[i(\omega_s t - k_s z)] + c.c. \tag{2B}$$

Expression (2A) denotes reflection-type phase conjugate light, a progressive wave in a −z direction, and Expression (2B) indicates transmission-type phase conjugate light, a progressive wave in the +z direction. From Expressions (1) and (2A) is derived the following expression regarding the reflection-type phase conjugate light:

$$E_c(r,t) = E_s(r,-t) \tag{3}$$

Thus it can be seen that the phase conjugate light has the property of time reversal. On the other hand, the transmission-type phase conjugate light has the property of time reversal regarding transverse components. Using suitably the property of time reversal makes it possible to compensate for phase fluctuation such as linear phase distortion in optical transmission lines (e.g., effects from chromatic dispersion) and polarization fluctuation.

How chromatic dispersion is compensated will now be described. In the system of FIG. 1, $E_{S1}$ stands for the signal light fed by the optical transmitter 1 onto the optical transmission line 2, $E_{S2}$ for the signal light sent over the optical transmission line 2 to the phase conjugate light generation means 3, $E_{C1}$ for the phase conjugate light supplied by the phrase conjugate light generation means 3 onto the optical transmission line 4, and $E_{C2}$ for the phase conjugate light sent over the optical transmission line 4 to the optical receiver 5. $L_1$ and $L_2$ denote the lengths of the optical transmission lines 2 and 4, respectively. If the transmitted signal is represented by $S(t)$ and the Fourier transform thereof by $F(\Omega)$, one gets:

$$S(t) = \int_{-\infty}^{\infty} F(\Omega) \exp[i\Omega t] d\Omega \tag{4}$$

Therefore, the signal light $E_{S1}$ is given by the expression:

$$E_{s1}(t) = \int_{-\infty}^{\infty} F(\Omega) \exp[i(\omega_s + \Omega)t] d\Omega \tag{5}$$

where, $\Omega$ denotes a modulation frequency that is sufficiently smaller than $\omega_S$ ($\Omega \ll \omega_S$). With the propagation constant of the optical transmission line 2 represented by $\beta(\omega)$, the above expression is subjected to Taylor expansion with respect to $\omega_S$, as follows:

$$\beta(\omega_s + \Omega) = \beta(\omega_s) + \frac{\partial \beta(\omega_s)}{\partial \omega} \Omega + (1/2) \frac{\partial^2 \beta(\omega_s)}{\partial \omega^2} \Omega^2 + \ldots \tag{6}$$

From Expressions (5) and (6) is derived the following expression providing the signal $E_{S2}$ fed to the phase conjugate light generation means 3 for up to second-order approximations with respect to $\Omega$:

$$E_{S2}(t) = \int_{-\infty}^{\infty} F(\Omega) \exp[i(\omega_S + \Omega)t - \beta(\omega_S + \Omega)L_1] d\Omega = \tag{7}$$

$$\exp[i(\omega_S t - \beta_0 L_1)] \times \int_{-\infty}^{\infty} F(\Omega) \exp\left[ i \left[ \Omega \left( t - \frac{\partial \beta(\omega_S)}{\partial \omega} L_1 \right) - \right.\right.$$

$$\left.\left. (1/2) \frac{\partial^2 \beta(\omega_s)}{\partial \omega^2} \Omega^2 L_1 \right] \right] d\Omega$$

where, $\beta_o = \beta(\omega_S)$. The group velocity $v_g$ and group velocity dispersion (GVD) of the signal light are given by the following expression:

$$\frac{\partial \beta^{-1}}{\partial \omega} \equiv v_g \tag{8}$$

$$\frac{\partial^2 \beta}{\partial \omega^2} = -v_g^{-2} \frac{\partial v_g}{\partial \omega} \tag{9}$$

Suppose that $T(\Omega)$ represents the conversion efficiency with which the signal light is converted to phase conjugate light by the phase conjugate light generation means 3 and that $\phi(\Omega)$ denotes the phase deviation involved. In that case, the signal light $E_{C1}$ fed by the phase conjugate light generation means 3 onto the optical transmission line 4 is expressed as follows:

$$E_{C1}(t) = \exp[i(\omega_c t + \beta_0 L_1)] \times \tag{10}$$

$$\int_{-\infty}^{\infty} T(\Omega) F^*(\Omega) \exp\left[ i \left[ -\Omega \left( t - \frac{\partial \beta(\omega_S)}{\partial \omega} L_1 \right) + \right.\right.$$

$$\left.\left. (1/2) \frac{\partial^2 \beta(\omega_s)}{\partial \omega^2} \Omega^2 L_1 + \phi(\Omega) \right] \right] d\Omega$$

The expression below is obtained by subjecting the above expression to Taylor expansion with respect to $\omega_S$, with $\beta'(\omega)$ denoting the propagation constant of the optical transmission line 4:

$$\beta'(\omega_C - \Omega) = \beta'(\omega_C) \frac{\partial \beta'(\omega_C)}{\partial \omega} \Omega + (1/2) \frac{\partial^2 \beta'(\omega_C)}{\partial \omega} \Omega^2 + \ldots \quad (11)$$

The expression below is provided by finding the phase conjugate light $E_{C2}$ fed from the optical transmission line 4 to the optical receiver 5 in the same manner as Expression (7) was obtained:

$$E_{C2}(t) = \exp[i(\omega_C t + \beta_0 L_j - \beta'_0 L_j)] \times \quad (12)$$

$$\int_{-\infty}^{\infty} T(\Omega) F^*(\Omega) \exp\left[ i \left[ -\Omega \left( t - \frac{\partial \beta(\omega_S)}{\partial \omega} L_1 - \frac{\partial \beta'(\omega_C)}{\partial \omega} L_2 \right) + \right.\right.$$

$$\left.\left. (1/2) \left( \frac{\partial^2 \beta(\omega_S)}{\partial \omega^2} L_1 - \frac{\partial^2 \beta'(\omega_C)}{\partial \omega^2} L_2 \right) \Omega^2 + \phi(\Omega) \right] \right] d\Omega \quad (15)$$

Thus the total sum of group delay is given by the sum of delays on the optical transmission lines 2 and 4:

$$(\partial \beta(\omega_S)/\partial \omega) L_1 + (\partial \beta'(\omega_C)/\partial \omega) L_2$$

It follows that the dispersion occurring when the signal light propagates over the optical transmission line 2 is offset by the dispersion in effect when the phase conjugate light propagates over the optical transmission line 4, provided that the condition of the following expression is met:

$$\frac{\partial^2 \beta(\omega_S)}{\partial \omega^2} L_1 = \frac{\partial^2 \beta'(\omega_C)}{\partial \omega^2} L_2 \quad (13)$$

Given the results above, it is possible to achieve effective compensation for chromatic dispersion by making the optical transmission lines 2 and 4 equal in length provided that the dispersion characteristics of both lines are the same. Where the optical transmission lines 2 and 4 have different dispersion characteristics, the compensation for the dispersion is accomplished effectively by setting the lengths of both lines in such a way that Expression (12) is satisfied.

The above description, accompanied by Expressions (1) through (12), applies where phase conjugate light is obtained through the non-degenerate FWM, with different frequencies assigned to signal light, pump light and phase conjugate light. However, similar compensation for chromatic dispersion is also available where phase conjugate light is generated through a degenerate process of FWM, with the same frequency assigned to both signal light and excitation light. In that case, the requirement $\omega_S = \omega_C$ need only be met.

Figure 2:
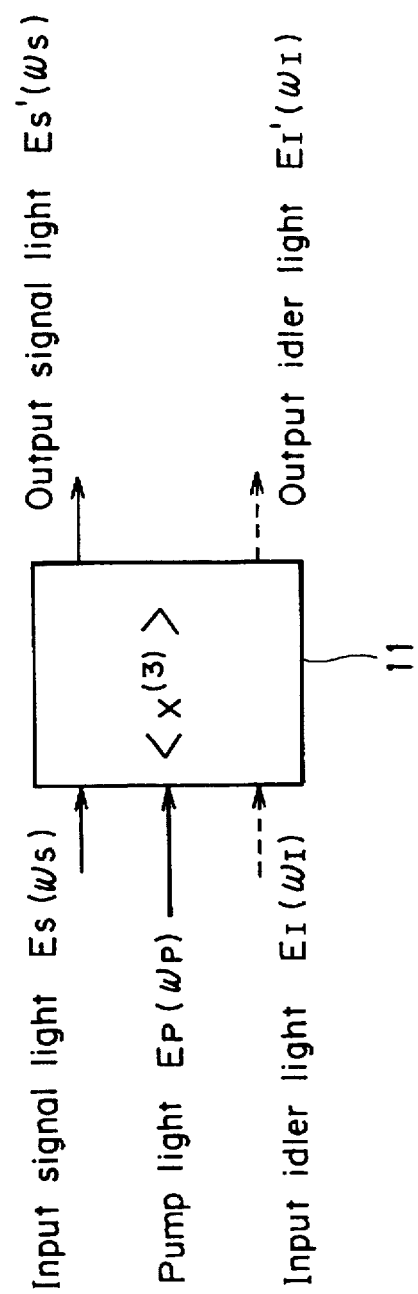
FIG. 2 is a view depicting the principle of generating phase conjugate light through FWM in a third order non-linear medium.

FIG. 2 is a view depicting the principle of generating phase conjugate light through FWM. Phase conjugate light is generated preferably through FWM, or of forward FWM in particular. From the mixture of forward four light waves derives a three-order nonlinear optical process triggered by high-intensity pump light $E_P$ (with frequency $\omega_P$). Specifically, the forward FWM produces interaction between part of the pump light and signal light, resulting in nonlinear polarization that leave the phase conjugate light. The process above generates signal light $E_S'$ of frequency $\omega_S$ and wave vector $k_S$ as well as idler light $E_I'$ of frequency $\omega_I$, and wave vector $k_I$ based on the signal light $E_S$ of frequency $\omega_S$ and wave number $k_S$. In particular, in the setup of FIG. 2 where the excitation light $E_P$ of frequency $\omega_P$ and wave number $k_P$ is supplied to a nonlinear optical medium 11 in the same direction as the signal light, $k_I = 2k_P - k_S$. Thus the idler light is output in the same direction as the signal light's incidence. At this point, the following relationship holds because of the law of conservation of energy:

$$\omega_S + \omega_I = 2\omega_P \quad (14)$$

Figure 3:
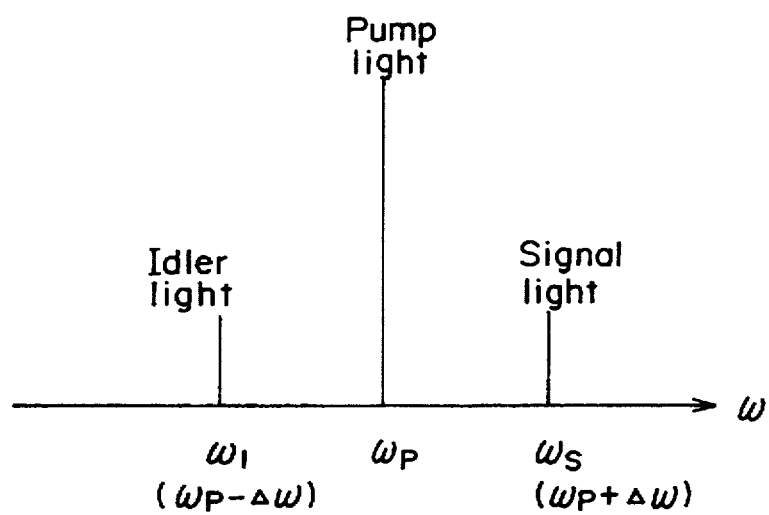
FIG. 3 is a view showing how the frequencies of signal light, pump light and idler light are arranged illustratively.

FIG. 3 shows how the frequencies of the signal light, pump light and idler light are arranged illustratively in the above setup. On the frequency axis, the signal light is seen to be in symmetrical relation to the idler light about the pump light. In FIG. 3, the difference in frequency among the signal light, idler light and pump light is given as $$\Delta \omega = |\omega_P - \omega_S| = |\omega_P - \omega_I|$$

Suppose that L stands for the interactive length of the nonlinear optical effect as depicted in FIG. 3. In that case, the generating equation is given as $$E_I = \exp(igL)[(1 + igL)E_I + igLE^*_S] \quad (15)$$

$$E^*_S = \exp(-igL)[-igLE_I + (1 - igL)E^*_S] \quad (16)$$

and $$g = \kappa |E_P|^2 \quad (17)$$

$$\kappa = \frac{3\omega_P}{2nc} <\chi^{(3)}> \quad (18)$$

where, n and $\chi^{(3)}$ denote the refractive index and third-order nonlinear susceptibility of the nonlinear optical medium 11, respectively, and $<\chi^{(3)}>$ represents the average age of all polarized states of the nonlinear constant $\chi^{(3)}$. It is assumed here that $$|\delta k| = |2k_P - k_S - K_I| = 0$$

wherein phase matching is established. In Expression (15), $E_I = 0$ where there is no input idler light. From this, it is clear that the output idler light $E_I'$ is the phase conjugate light for the input signal light $E_S$. The gains $G_S$ and $G_I$ for the signal light and idler light are provided by the following expression:

$$G_S = G = 1 + (gL)^2 \quad (19)$$

$$G_I = (G-1) = (gL)^2 \quad (20)$$

That is, signal amplification is accomplished concurrently with the generation of phase conjugate light through FWM. It follows that what is compensated here is not only chromatic dispersion but also signal attenuation. These features allow a high-performance optical repeater to be implemented.

Figure 4:
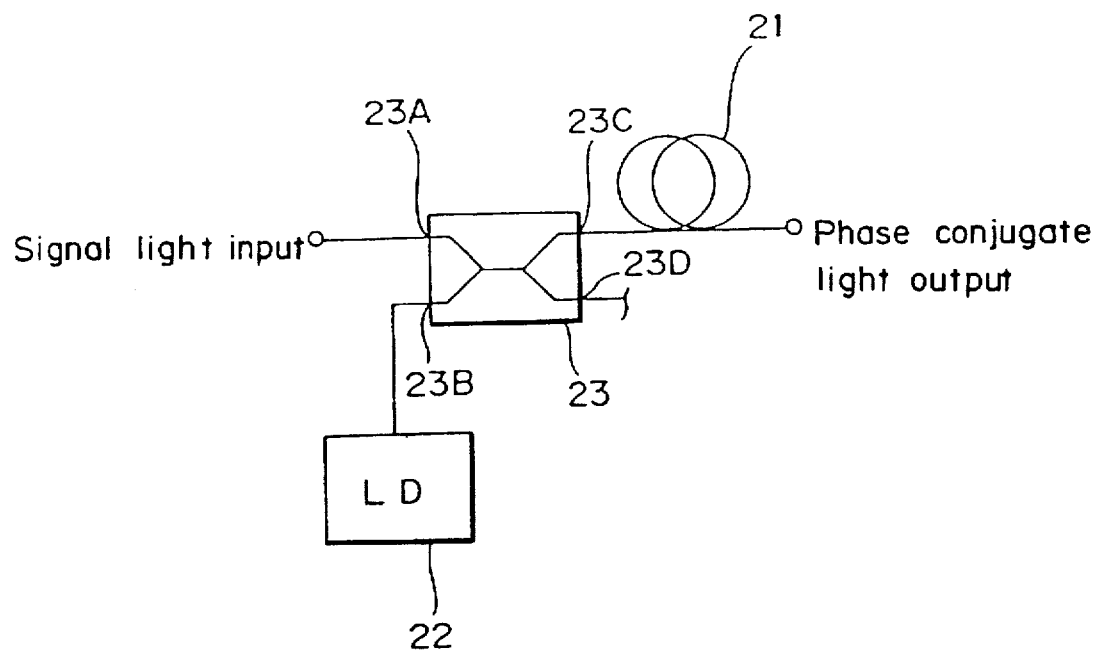
FIG. 4 is a block diagram of a first embodiment of phase conjugate light generation means according to the invention.

FIG. 4 is a block diagram of the first embodiment of the phase conjugate light generation means 3 included in FIG. 1. The nonlinear optical medium 6, pump light source 7 and signal light/pump light supply means 8 in FIG. 1 are matched by an optical fiber 21, a laser diode 22 and a optical coupler 23 in FIG. 4, respectively. The optical fiber 21 as the nonlinear optical medium is preferably a single mode optical fiber. In this setup, where the wavelength of the signal light is made to differ slightly from that of the pump light so as to produce non-degenerate FWM, the wavelength allowing the optical fiber 21 to provide zero dispersion is made the same as that of the pump light (i.e., oscillation wave-length of the laser diode 22). In place of the optical fiber, semiconductor optical amplifier can be use as the nonlinear optical medium. The optical coupler 23 has four ports, 23A, 23B, 23C and 23D. The port 23A is connected to the optical transmission line 2 of FIG. 1, the port 23B to the laser diode 22, the port 23C to a first end of the optical fiber 21, and the port 23D to a dead end. A second end of the optical fiber 21 is connected to the optical transmission line 4 of FIG. 1. In this specification, the wording "to connect" or "connection"

refers to operative connections including direct optical connection, connection through such optical devices as optical filters and optical isolators, and connection under conditions where the polarized state is properly adjusted. The optical coupler 23 functions at least to have the port 23C output the light received through the ports 23A and 23B. Illustratively, the optical coupler 23 may be a fiber-fused coupler, a half mirror, an optical multiplexer or a polarized beam splitter. The constitution of the first embodiment allows both the signal light fed to the port 23A of the optical coupler 23 and the pump light fed to the port 23B from the laser diode 22 to be placed onto the optical fiber 21 which is a nonlinear optical medium. This generates transmission-type phase conjugate light through FWM. The phase conjugate light is fed onto the optical transmission line 4 of FIG. 1.

The laser diode 22 can be frequency modulated at low frequency (10 KHz–1 MHz). By the modulation, SBS (Stimulated Brillouin Scattering) in the optical fiber 21 is suppressed. As a result, the power of the pump light can be increased so as to obtain high generation efficiency of phase conjugate light.

Figure 5:
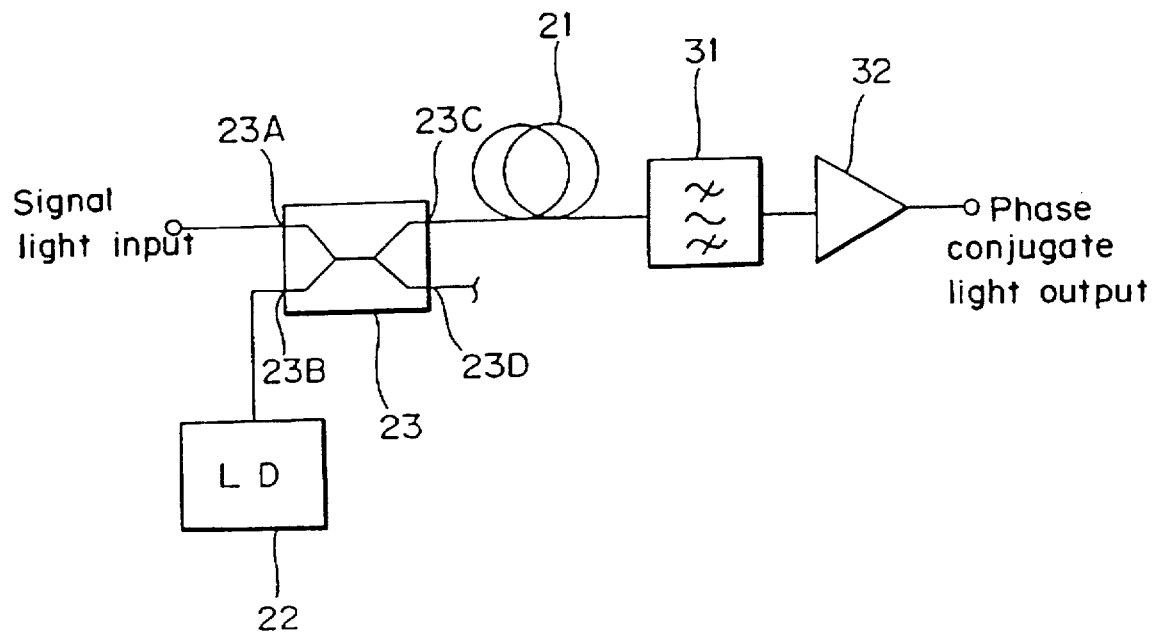
FIG. 5 is a block diagram of a second embodiment of the phase conjugate light generation means.

FIG. 5 is a block diagram of the second embodiment of the phase conjugate light generation means 3 in FIG. 1. Unlike the first embodiment of the phase conjugate light generation means of FIG. 4, the second embodiment feeds the phase conjugate light generated within the optical fiber 21 onto the optical transmission line 4 of FIG. 1 through an optical band pass filter 31 and an optical amplifier 32, in that order. The optical amplifier 32 is illustratively a linear optical amplifier. A typical constitution of the optical amplifier 32 includes a doped fiber doped with rare earth elements such as Er, a pumping light source for outputting pumping light, and means for supplying the doped fiber with the pumping light together with the light to be amplified. The optical band pass filter 31 is provided to remove unnecessary optical elements such as signal light, pump light and noise light. With these types of light eliminated, it is possible to prevent the optical amplifier 32 from getting saturated in operation illustratively by the pump light from the laser diode 22. That in turn allows the phase conjugate light generated in the optical fiber 21 to be sufficiently amplified. Generally, the intensity of the pump light for generating phase conjugate light is extremely high compared with the intensity of signal light or phase conjugate light. It follows that the removal of unnecessary optical elements by the optical band pass filter 31 prevents pump light of high intensity from producing nonlinear optical effects in downstream optical transmission lines. Another benefit of the removal of unnecessary optical elements by the optical band pass filter 31 is the elimination of the difficulty of demodulation attributable to the presence of pump light when the demodulated signal is reproduced from the phase conjugate light received by the optical receiver 5 in FIG. 1. As with an experimental system to be discussed later, an optical amplifier and an optical band pass filter may be inserted, in that order, between the optical transmission line 2 and the port 23A of the optical coupler 23 in FIG. 1. This construction generates phase conjugate light efficiently within the nonlinear optical medium. Where the intensity of the pump light from the laser diode 22 is sufficiently high, the phase conjugate light generated in the optical fiber 21 may become higher in intensity than the signal light fed to the same fiber. In such a case of added amplification, the optical amplifier 32 need not be used.

Figure 6:
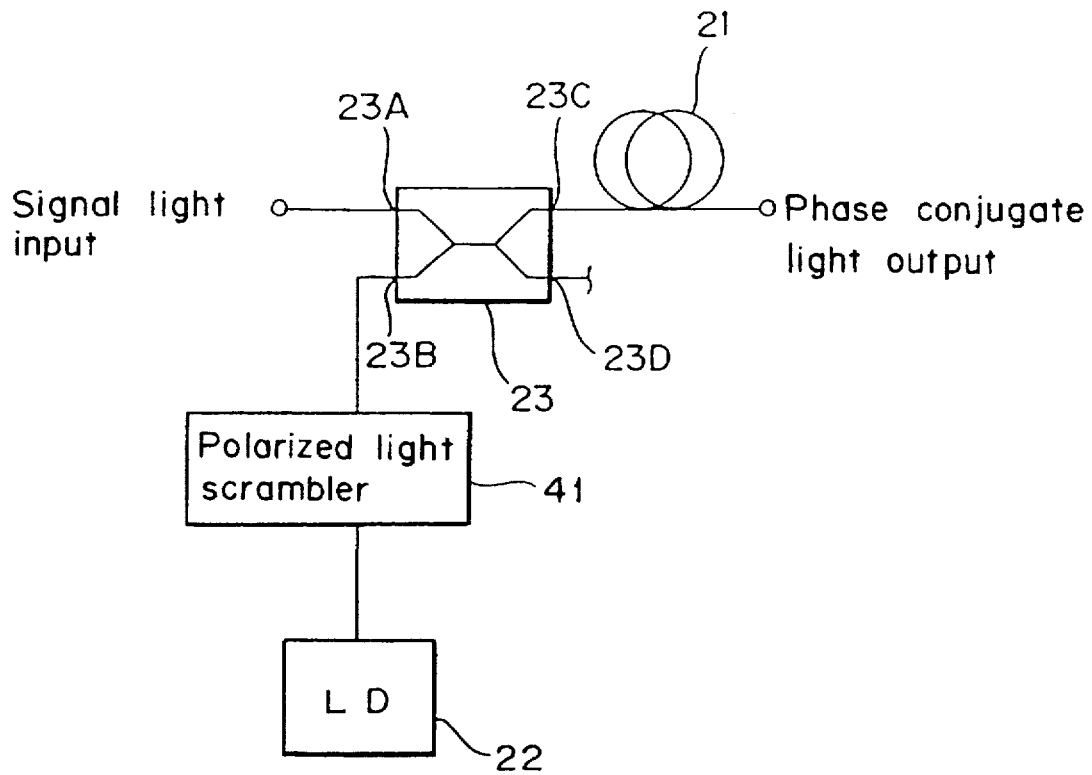
FIG. 6 is a block diagram of a third embodiment of the phase conjugate light generation means.

FIG. 6 is a block diagram of the third embodiment of the phase conjugate light generation means 3 in FIG. 1. Unlike the first embodiment of the phase conjugate light generation means of FIG. 4, the third embodiment interposes a polarized light scrambler 41 between the laser diode 22 as the pump light source and the port 23B of the optical coupler 23. Generally, the propagation mode of single mode optical fibers includes two polarization modes in which one plane of polarization is perpendicular to the other. These two polarization modes are combined under various kinds of external disturbance. As a result, the polarized state of the light output from the second end of the optical fiber fails to match the polarized state of the light fed to the first end of the same fiber. Thus if the optical transmission line 2 of FIG. 1 is made of a single mode optical fiber, the polarized state of the signal light fed to the phase conjugate light generation means 3 varies over time due to changes in ambient conditions. Meanwhile, the efficiency of the phase conjugate light generation means 3 in FIG. 1 converting the signal light into phase conjugate light depends on the relationship between the polarized state of the signal light supplied to the phase conjugate light generation means 3 and the polarized state of the pump light, as is evident from the above-described principle of phase conjugate light generation. According to the third embodiment of the phase conjugate light generation means of FIG. 6, the pump light from the laser diode 22 is made to join the signal light via the polarized light scrambler 41. In that case, even with the polarized state of the supplied signal light varying over time, the efficiency of converting signal light into phase conjugate light is kept constant so as to stabilize the phase conjugate light generation means in operation. The polarized light scrambler 41, composed conventionally of a half-wave plate, a quarter-wave plate and the like, acts to rotate the plane of polarization of the pump light from the laser diode when the pump light is, say, substantially linear. The polarized state of the supplied signal light changes relatively slowly under varying ambient conditions. For this reason, polarization dependency is sufficiently eliminated by setting the operating frequency of the polarized light scrambler 41 (e.g., reciprocal number of the rotating cycle of the plane of polarization) for about 1 to 100 kHz. Although the polarized light scrambler 41 acts on the pump light from the laser diode 22 in the above example, the polarized light scrambler may alternatively be made to operate on the pump light or the signal light.

Figure 7:
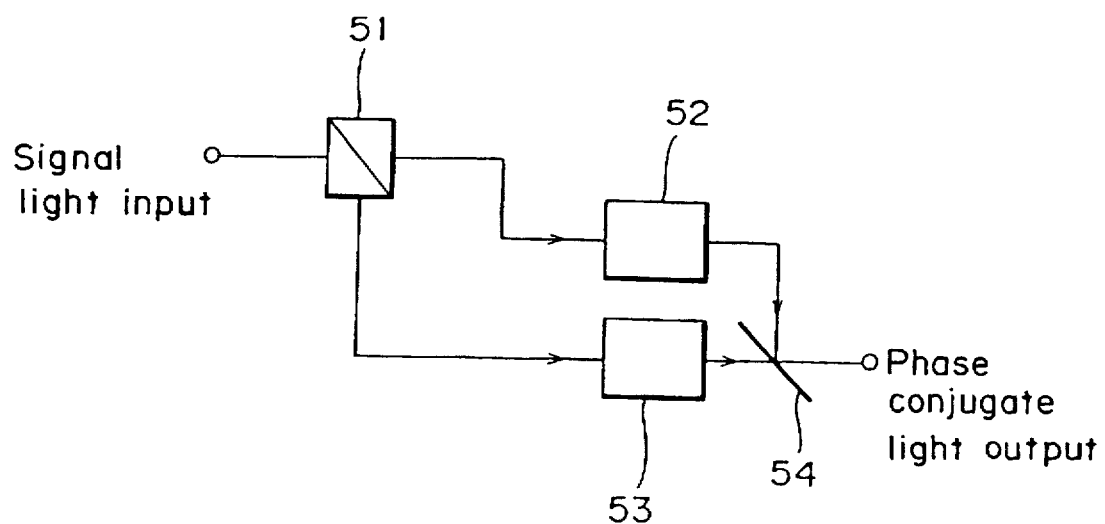
FIG. 7 is a block diagram of a fourth embodiment of the phase conjugate light generation means.

FIG. 7 is a block diagram of the fourth embodiment of the phase conjugate light generation means 3 in FIG. 1. The fourth embodiment comprises a polarized beam splitter 51, phase conjugate light generators 52 and 53, and a polarized light composer 54. The polarized beam splitter 51 splits the signal light from the optical transmission line of FIG. 1 into a first and a second polarized light component of which the planes of polarization are orthogonally crossed. The phase conjugate light generators 52 and 53 receive the first and the second polarized light components from the polarized beam splitter 51 and generate two streams of phase conjugate light based on each component. The polarized light composer 54 combines the two streams of phase conjugate light from the phase conjugate generators 52 and 53. Illustratively, the polarized light composer 54 may be a polarized beam splitter. The phase conjugate light composed by the polarized light composer 54 is fed onto the optical transmission line 4. The phase conjugate light generators 52 and 53 may illustratively adopt the constitution of FIG. 4. According to the fourth embodiment, the first and the second polarized light components of the signal light fed to the phase conjugate light generators 52 and 53 are both linearly polarized. This makes it easy for the phase conjugate light generators 52 and 53 to make the polarized state of the supplied signal light (first or second polarized light component) coincide with the polarized state of the pump light, whereby the phase conjugate light generation means with no polarization dependency is realized. That is, irrespective of the changes in the polarized state of the signal light from the optical transmission line 2 of FIG. 1, the fourth embodiment keeps feeding the optical transmission line 4 with the phase conjugate light of constant intensity.

Figure 8:
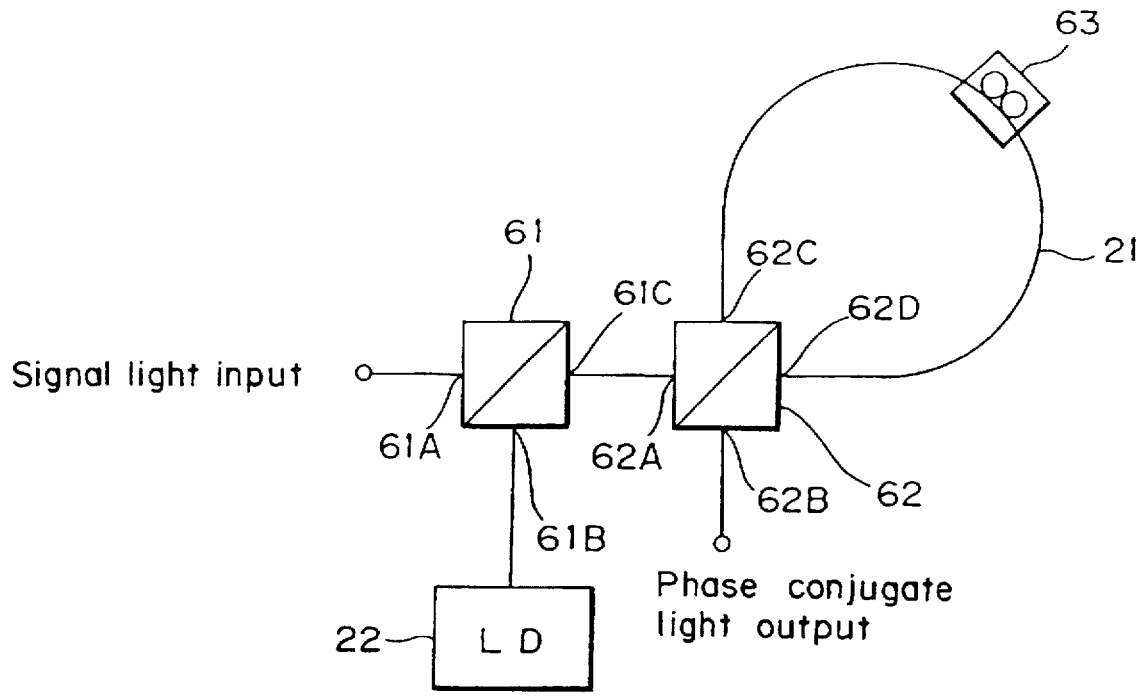
FIG. 8 is a block diagram of a fifth embodiment of the phase conjugate light generation means.

FIG. 8 is a block diagram of the fifth embodiment of the phase conjugate light generation means 3 in FIG. 1. As with the first through the fourth embodiments, the fifth embodiment uses the laser diode 22 as the pump light source and the optical fiber 21 as the nonlinear optical medium 6. The fifth embodiment has signal light/pump light supply means 8 including a optical coupler 61 and a polarized beam splitter 62. This construction is intended to move signal light and pump light bidirectionally through the optical fiber 21 that is a nonlinear optical medium. The optical coupler 61 has ports 61A, 61B and 61C. The light fed to the ports 61A and 61B is output from the port 61C. The port 61A is connected to the optical transmission line 2 of FIG. 1, and the port 61B is connected to the laser diode 22 as the pump light source. The polarized beam splitter 62 has ports 62A, 62B, 62C and 62D. The light fed to the ports 62A and 62B is split into two orthogonally polarized light components. The two polarized light components are output from the ports 62C and 62D. In addition, the light fed to the ports 62C and 62D is split into two orthogonally polarized light components. The port 62A is connected to the port 61C of the optical coupler 61 and the port 62B to the optical transmission line 4 of FIG. 1. The optical fiber 21 is interposed between the ports 62C and 62D. Halfway through the optical fiber 21 is furnished a polarized light controller 63 formed conventionally from a half-wave plate, a quarter-wave plate and the like. The polarized light controller 63 keeps the polarized state of the light fed to the optical fiber 21 identical to the polarized state of the light output from the same fiber 21. The optical coupler 61 allows the supplied signal light to join the pump light from the laser diode 22. The signal light and the pump light are split by the polarized beam splitter 62 into a first and a second polarized light component. The plane of polarization of the first polarized light component is perpendicular to that of the second polarized light component. The first and the second polarized light components propagate over the optical fiber 21 in the mutually opposite directions. When these two components again pass through the polarized beam splitter 62, they are split and combined into a beam for output from the port 62B. The plane of polarization of the pump light from the laser diode 22 is set so that the pump light is distributed at a 1-to-1 ratio to the first and the second polarized light components split by the polarized beam splitter 62. That is, the laser diode 22 is set so that the plane of polarization of the pump light fed to the port 62A of the polarized beam splitter 62 is substantially at 45 degrees relative to the plane of polarization of the first and of the second polarized light component. In this setup, the two orthogonally polarized light components moved in the opposite directions over the optical fiber 21 are acted on by the respectively matched two orthogonally polarized light components of the pump light. When two kinds of phase conjugate light generated in the opposite directions within the optical fiber 21 are combined by the polarized beam splitter 62 for output from the port 62B, the output phase conjugate light is held at a constant intensity level regardless of the changes in the polarized state of the supplied signal light.

Figure 9:
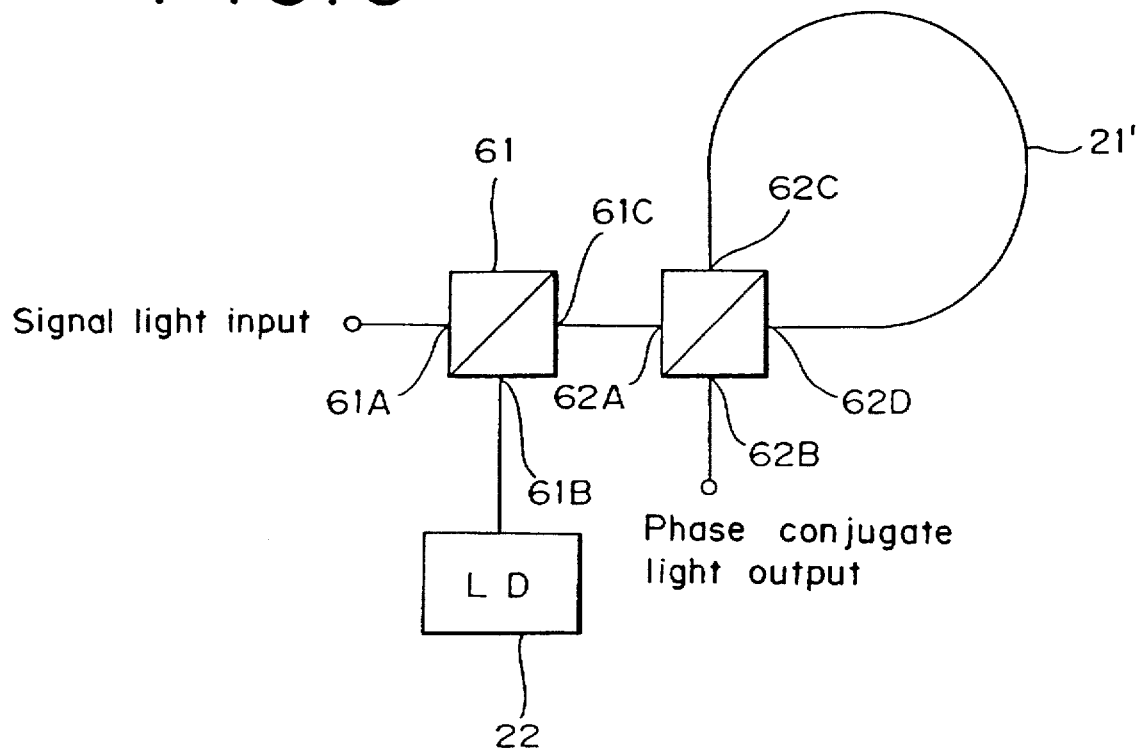
FIG. 9 is a block diagram of a sixth embodiment of the phase conjugate light generation means.

FIG. 9 is a block diagram of the sixth embodiment of the phase conjugate light generation means 3 in FIG. 1. Unlike the fifth embodiment of the phase conjugate light generation means of FIG. 8, the sixth embodiment utilizes a polarization maintaining optical fiber 21' in place of the optical fiber 21. The polarization maintaining optical fiber 21' is connected to the polarized beam splitter 62 so that the polarized state of the light fed to the polarization maintaining optical fiber 21' coincides with the polarized state of the light output from the same fiber 21'. In this case, the principal axis of the polarization maintaining optical fiber 21' is in parallel with the plane of polarization of the linear polarized light that was polarized and split by the polarized beam splitter 62. The sixth embodiment eliminates the need for the polarized light controller 63, thereby simplifying the structure of the apparatus.

Figure 10:
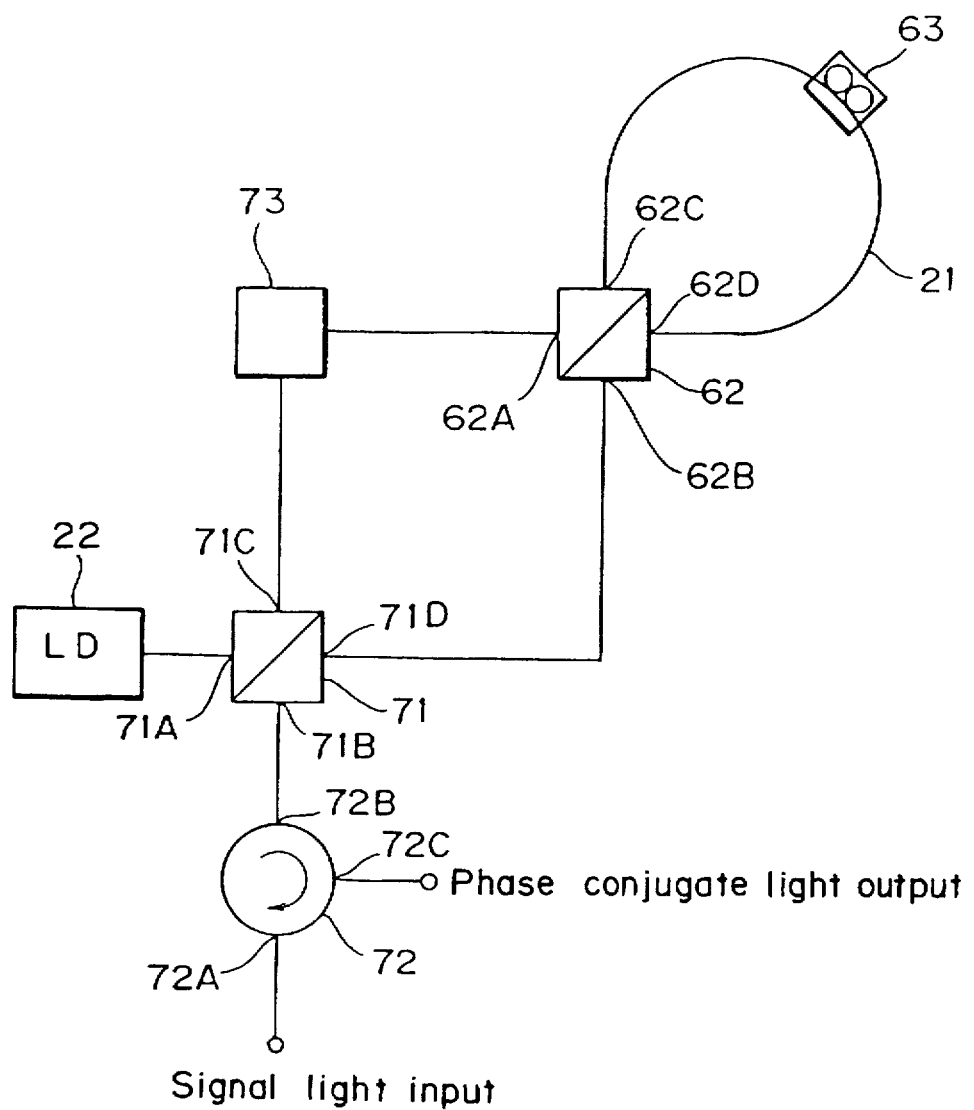
FIG. 10 is a block diagram of a seventh embodiment of the phase conjugate light generation means.

FIG. 10 is a block diagram of the seventh embodiment of the phase conjugate light generation means 3 in FIG. 1. As with the fifth embodiment of the phase conjugate light generation means of FIG. 8, the seventh embodiment comprises the optical fiber 21 as the nonlinear optical medium, laser diode 22 as the pump light source, polarized beam splitter 62, and polarized light controller 63. What characterizes the seventh embodiment is that it has its signal light/pump light supply means 8 include a optical coupler 71, a half-wave plate 73 and a polarized beam splitter 62. The arrangement is intended to separate, during generation of phase conjugate light, an unconsumed portion of pump light from the generated phase conjugate light. The signal light/pump light supply means 8 also has an optical circulator 72 that separates a port for receiving signal light from another port for outputting phase conjugate light. The optical circulator 72 has three ports, 72A, 72B and 72C. The light fed to the port 72A is output from the port 72B; the light furnished to the port 72B is output from the port 72C; and the light supplied to the port 72C is output from the port 72A. The port 72A is connected to the optical transmission line 2 of FIG. 1, while the port 72C is connected to the optical transmission line 4. The optical coupler 71 has four ports, 71A, 71B, 71C and 71D. The light fed to the ports 71A and 71B is equally distributed for output from the ports 71C and 71D; the light supplied to the ports 71C and 71D is equally distributed for output from the ports 71A and 71B. Illustratively, the optical coupler 71 may be a half mirror or a fiberfused type optical fiber. The port 71A of the optical coupler 71 is connected to the laser diode 22 that acts as the pump light source, the port 71B to the port 72B of the optical circulator 72, and the port 71D to the port 62B of the polarized beam splitter 62. The half-wave plate 73 is inserted into an optical path between the port 71C of the optical coupler 71 and the port 62A of the polarized beam splitter 62. On receiving light, the half-wave plate 73 rotates its plane of polarization by 90 degrees. The seventh embodiment is arranged so that the polarized state of the pump light fed to the port 71A of the optical coupler 71 coincides with the polarized state of the signal light supplied to the port 71B of the optical coupler 71 from the laser diode 22 via the optical circulator 72.

How the seventh embodiment works will now be described on the assumption that the pump light and signal light are linearly polarized light beams having planes of polarization perpendicular to the plane of FIG. 10. The signal light and pump light fed respectively to the ports 71A and 71B of the optical coupler 71 are equally distributed for output from the ports 71C and 71D. The signal light and pump light output from the port 71C are rotated by 90 degrees by the half-wave plate 73 in terms of plane of polarization. The results are linearly polarized light beams having planes of polarization paralleling the plane of FIG.

10, the beams being fed to the port 62A of the polarized beam splitter 62. The signal light and pump light fed to the port 62A are supplied through the port 62D to the optical fiber 21. When these beams are moved counterclockwise within the optical fiber 21 in FIG. 10, phase conjugate light is generated in the same direction. This phase conjugate light and the residual pump light are supplied through the port 62C to the polarized beam splitter 62 and are output from the port 62B. Meanwhile, the signal light and pump light fed from the port 71D of the optical coupler 71 to the port 62B of the polarized beam splitter 62 have the plane of polarization perpendicular to the plane of FIG. 10. The signal light and pump light are furnished from the port 62D onto the optical fiber 21 for counterclockwise propagation therethrough, whereupon phase conjugate light is generated. The generated phase conjugate light and a residual portion of the pump light are sent through the port 62C to the polarized beam splitter 62 and output from the port 62A thereof. The phase conjugate light and pump light fed from the port 62A to the half-wave plate 73 have their plane of polarization rotated by 90 degrees to become a linearly polarized light beam in parallel with the plane of FIG. 10. The linearly polarized light beam is fed to the port 71C of the optical coupler 71. The pump light and phase conjugate light sent from the half-wave plate 73 to the port 71C, as well as the pump light and phase conjugate light fed from the port 62B of the polarized beam splitter 62 to the port 71D of the optical coupler 71, have their planes of polarization paralleling the plane of FIG. 10. The lengths of the optical paths that these two groups of light beams have passed through are exactly the same. The optical coupler 71 performs phase inversion on the pump light and phase conjugate light which are fed to the ports 71C and 71D and pass through specific paths therewithin. As a result, the pump light is output primarily from the port 71A and the phase conjugate light principally from the port 71B. The light output from the port 71B of the optical coupler 71 is supplied to the optical transmission line 4 of FIG. 1 via the optical circulator 72. According to the seventh embodiment, the phase conjugate light generated inside the optical fiber 21 acting as the nonlinear optical medium is separated from the residual pump light without the use of the optical filter (e.g., optical band pass filter 31 of FIG. 5). Since the intensity of the pump light used to generate phase conjugate light is extremely high compared with that of the latter, the seventh embodiment of FIG. 10 is useful in effectively separating the pump light of high intensity from the phase conjugate light obtained.

Although the above embodiments utilize only one kind of signal light, the invention may also apply where signal light is divided by frequency division multiplex into a plurality of signal light beams.

What follows is a description of how an experiment was conducted to demonstrate the workability of the invention, together with the results obtained therefrom. Details of the experiment are found in "Compensation of Chromatic Dispersion in a Single-mode Fiber by Optical Phase Conjugation" by S. Watanabe, T. Naito and T. Chikama (IEEE Photon. Technol. Lett., Vol. 5, 92–95, 1993).

Figure 11:
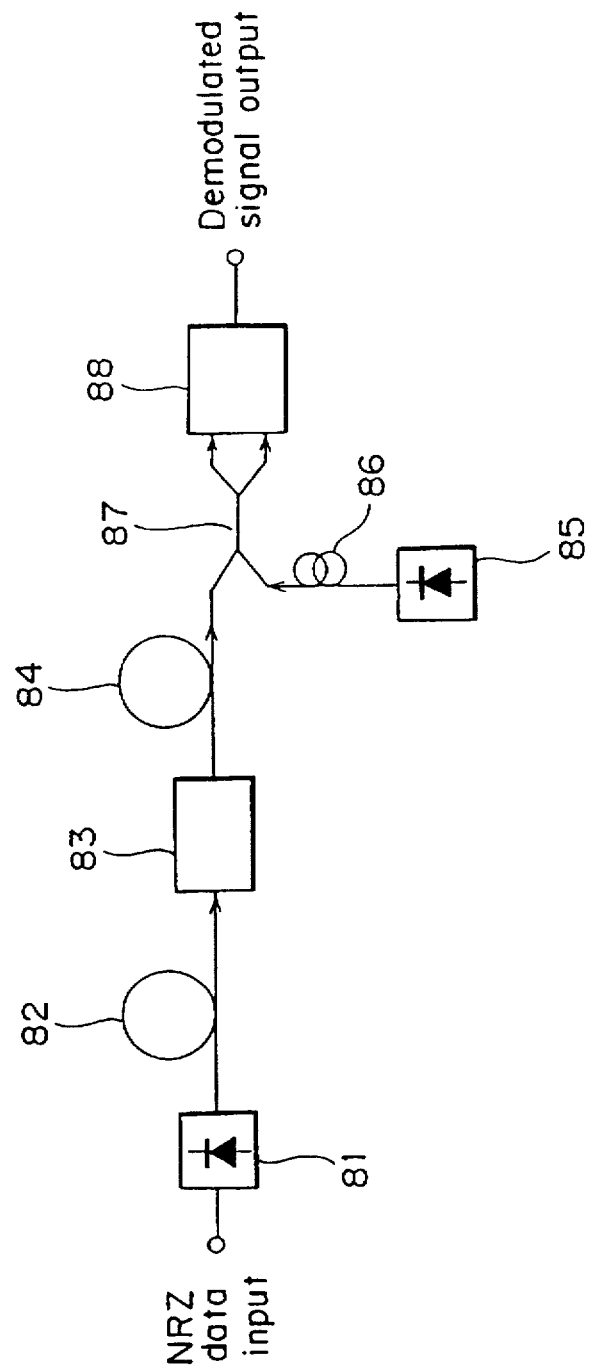
FIG. 11 is a block diagram of a system used for the applicant's demonstration experiment.

FIG. 11 is a block diagram of the system used for the applicant's demonstration experiment. In the system of FIG. 11, a signal light source 81 is a three-diode λ/4 shift type DFB-LD (distributed feedback laser diode) driven on an oscillation wavelength $\lambda_s$ of 1,546 nm. Details of the DFB-LD are discussed in "FM Response of Narrow-linewidth, Multielectrode λ/4 Shift DFB Laser" by S. Ogita, Y. Kotaki, M. Matsuda, Y. Kuwahara, H. Onaka, H. Miyata and H. Ishikawa (IEEE Photon. Technol. Lett., Vol. 2, pp. 165–166, 1990). Signal light modulation is accomplished by having the signal light source 81 directly modulated using a 5 Gb/s NRZ data stream (PN: $2^7-1$). The modulation system is continuous phase frequency shift keying (CPFSK) with the modulation index set at 0.87. Signal light whose intensity is +9.1 dBm is supplied to a single mode fiber 82 (loss: 0.23 dB/km) corresponding to the optical transmission line 2 of FIG. 1. The length $L_1$ of the single mode fiber 82 is 80 km, and the dispersion $D_1$, at the wavelength λs is 1,324 ps/nm. The signal light transmitted over the single mode fiber 82 is fed to a phase conjugate light generator 83 which converts the light to phase conjugate light having a wavelength $\lambda_C$ of 1,552 nm. The phase conjugate light thus generated is transmitted over a single mode fiber 84 corresponding to the optical transmission line 4 of FIG. 1 to reach a optical coupler 87. The optical coupler 87 couples the phase conjugate light with the local light fed from a local light source 85 through a polarized light controller 86, and sends the coupled light to a heterodyne receiver 88. The loss factor of the single mode fiber 84 is equivalent to that of the single mode fiber 82. The length $L_2$ of the single mode fiber 84 is 72 km, and the dispersion $D_2$ at the wavelength $\lambda_C$ is 1,203 ps/nm.

Figure 12:
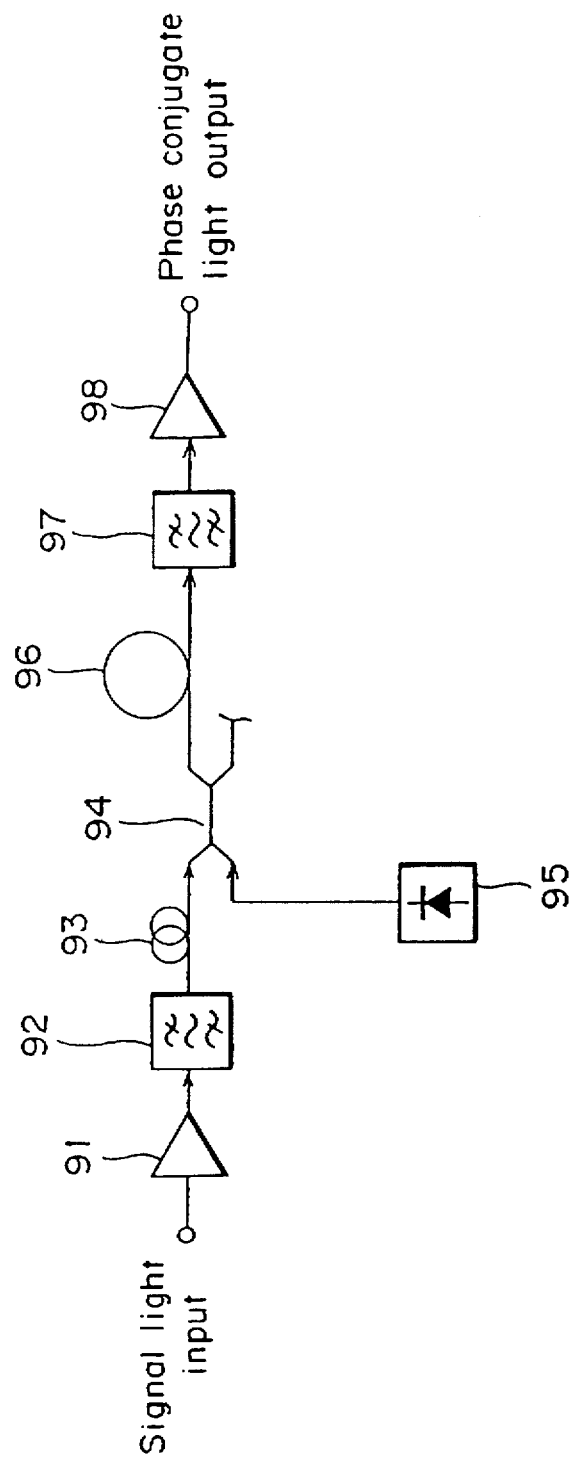
FIG. 12 is a block diagram of the phase conjugate light generator included in FIG. 11.

FIG. 12 is a block diagram of the phase conjugate light generator 83 included in FIG. 11. The supplied signal light is amplified by an optical amplifier 91 having an Er-doped fiber, forwarded through an optical filter 92 whose full width at half maximum is 3 nm, and controlled in polarized state by a polarized light controller 93. The output from the polarized light controller 93 joins in a optical coupler 94 the pump light from a pump light source 95. The pump light source 95 in this setup is a three-electrode DFB-LD operating on a wave-length $\lambda_P=1,549$ nm. The coupled output from the optical coupler 94 enters a dispersion shift fiber 96 whose length is 23 km and whose loss is 0.25 dB/km. Within the dispersion shift fiber 96, a non-degenerate process of FWM produces phase conjugate light that was converted so that its frequency is on the decrease. The signal light and pump light fed to the dispersion shift fiber 96 have +6.1 dBm and +7.4 dBm of power respectively. The zero dispersion wavelength of the dispersion shift fiber 96 is set for 1,549 nm, the same as $\lambda_P$, so as to achieve adequate phase matching. The generated phase conjugate light then passes through an optical filter 97 whose full width at half maximum in the pass band is 0.7 nm and is amplified by an optical amplifier 98. The output of the optical amplifier 98 is fed to the single mode fiber 84 of FIG. 11.

Figure 13:
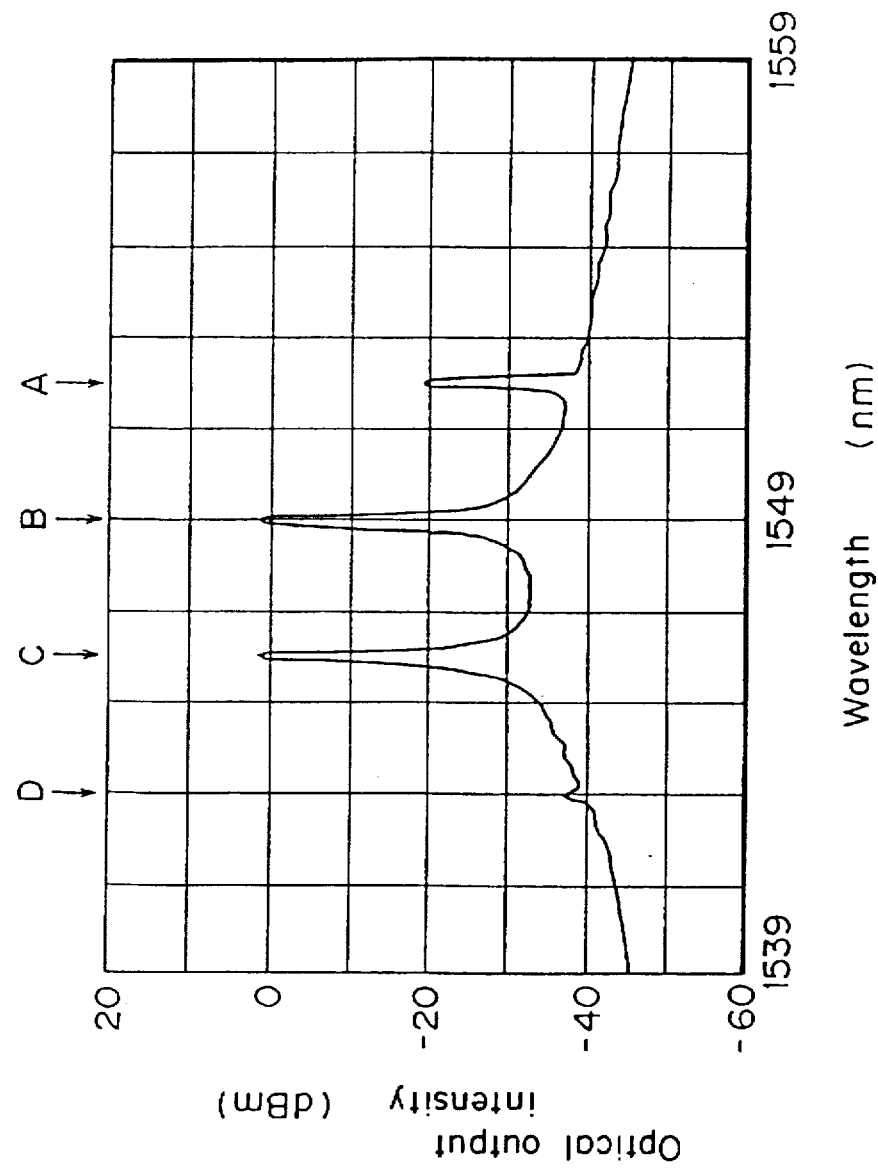
FIG. 13 is a view showing a typical spectrum of output light from the dispersion shift fiber included in FIG. 12.

FIG. 13 is a view showing a typical spectrum of output light from the dispersion shift fiber 96 included in FIG. 12. Peaks A, B and C belong to the phase conjugate light, pump light and signal light, respectively. A peak D belongs to the pump light converted so that its frequency is on the increase. The power of the phase conjugate light is −19.0 dBm. This value is equivalent to a conversion efficiency level of −25.1 dB in effect upon conversion from the signal light. The intensity levels indicated by the peaks B and C for the pump light and signal light are substantially the same. The fact that the peak A is sufficiently higher than the peak D demonstrates that making the wavelength of the pump light coincide with the zero dispersion wavelength of the dispersion shift fiber 96 accomplishes good phase matching. The receiving side of the above setup utilizes as its local light source 85 a three-electrode DFB-LD driven on a wavelength of $\lambda_L$ Of 1,552 nm. The heterodyne receiver 88 is a balanced optical receiver. The heterodyne detected signal is forwarded through a filter before being demodulated by a delayed modulator. The center frequency of an intermediate frequency signal is 8.7 GHz, and the full width at half maximum of the beat spectrum of the phase conjugate light is about 6 MHz.

Figure 14:
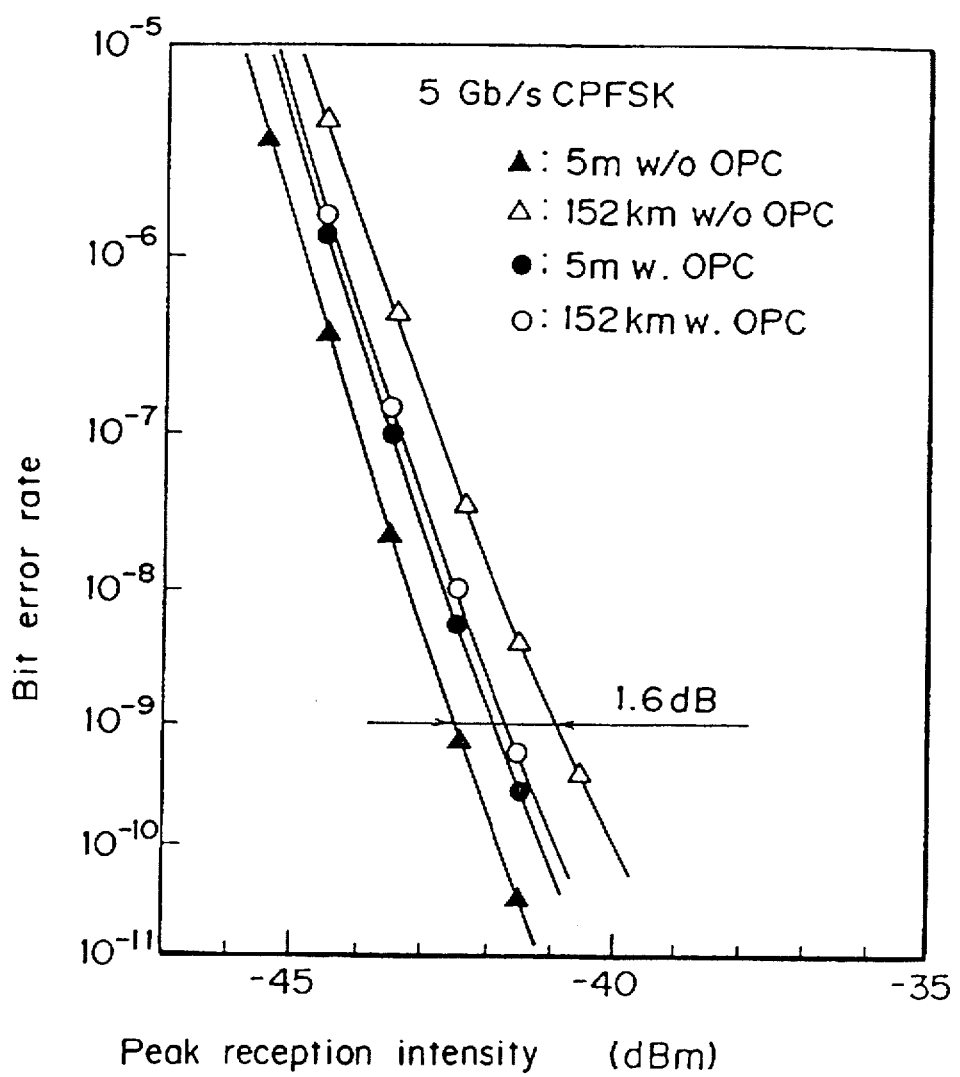
FIG. 14 is a view illustrating typical error rates obtained from the experiment.

FIG. 14 is a view illustrating typical error rates obtained from the experiment. Closed triangles denote the characteristic in effect when the sight light from the signal light source 81 is transmitted directly to the receiver through an optical transmission line 5 meters long; closed circles indicate the characteristic in effect when the signal light from the signal light source 81 is sent via the 5-meter-long optical transmission line and the phase conjugate light generator 83 to the receiving side; open circles stand for the characteristic in effect when the system of FIG. 11 is in operation; and open triangles represent the characteristic in effect when the system of FIG. 11 minus the phase conjugate light generator 83 is in operation. The sensitivity of reception with the 5-meter-long optical transmission line used but without recourse to the phase conjugate light generator 83 is –42.5 dBm with a bit error rate of $10^{-9}$. Power penalty is 1.6 dB, the value attributable to the dispersion given during transmission of signal light over 152 km (equivalent to the sum of the lengths of single mode fibers 82 and 84). Where the phase conjugate light generator 83 is not used for measurement, the oscillation wavelength of the local light source 85 is 1,546 nm. Utilizing the phase conjugate light generator 83 in the system of FIG. 11 improves the power penalty by 0.8 dB. Where the 5-meter-long optical transmission line is employed, the power penalty with the phase conjugate light generator 83 in use is 0.6 dB from that with the phase conjugate light generator 83 not used. This is attributable apparently to a deteriorated signal-to-noise ratio of the phase conjugate light generator 83. With the dispersion difference between the single mode fibers 82 and 84 of FIG. 11 taken into account, the results of the experiment above indicate that the dispersion is compensated effectively using the phase conjugate light generator 83.

Where the signal light is made of optical pulses (including pulse trains) derived from intensity or amplitude modulation, the pulse waveform may be distorted by something other than chromatic dispersion. The causes for such waveform distortion include, in particular:

(1) effect of chromatic dispersion and optical Kerr effect; and (2) random phase fluctuation due to the accumulation of ASE noise of optical amplifiers in an optically amplified multiple-point repeating transmission setup. Below are some examples for dealing with the pulse waveform distortion attributable to the above and other causes.

Figures 15A, 15B:
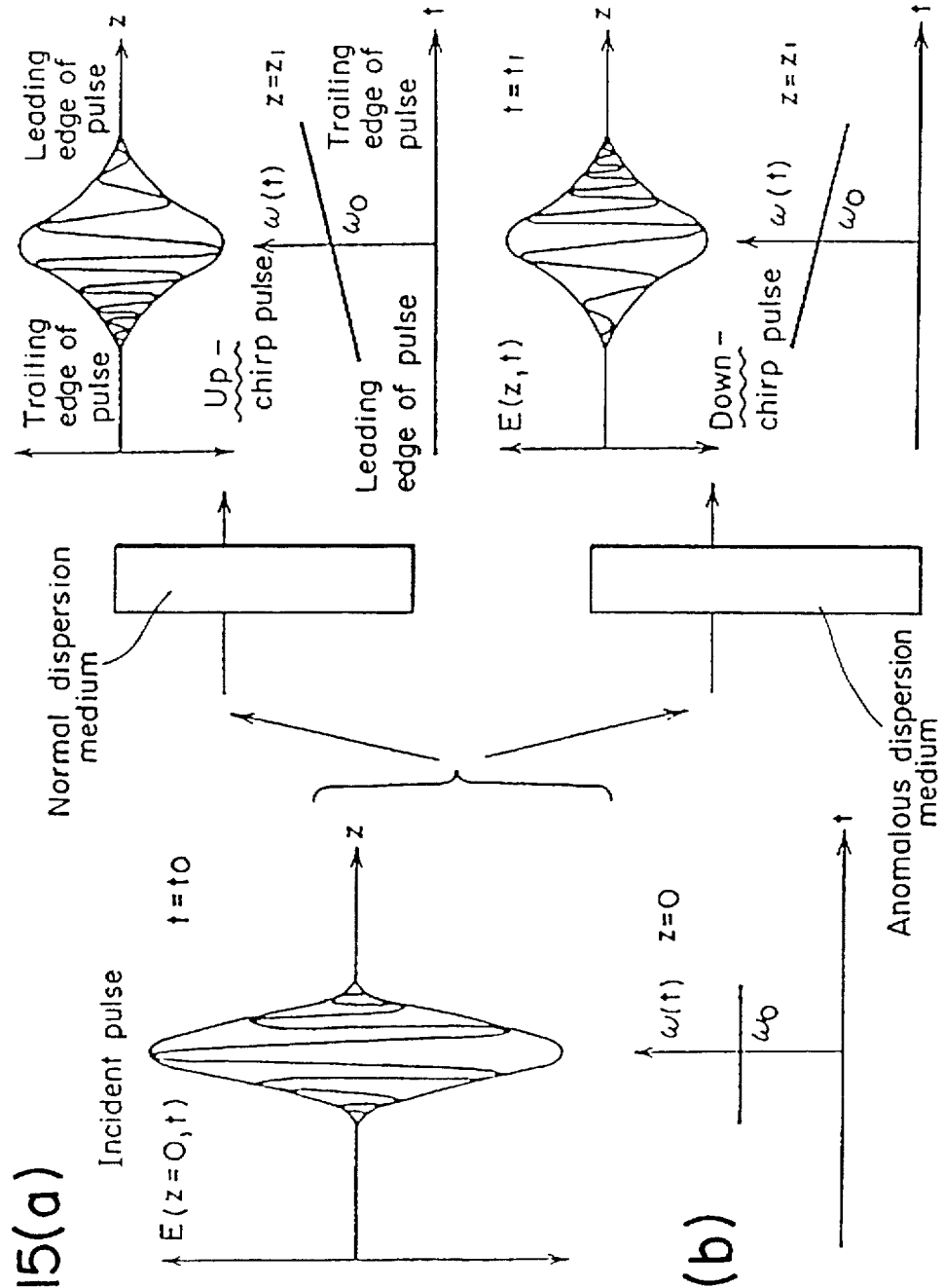
FIG. 15 is a view showing how chirping occurs due to dispersion.
Figure 16C:
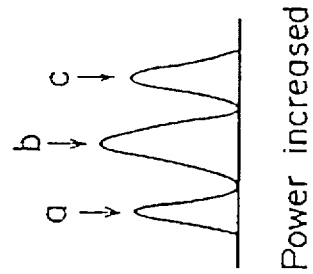
FIG. 16 is a view describing how waveforms are distorted due to chromatic dispersion and the optical Kerr effect.
Figure 16B:
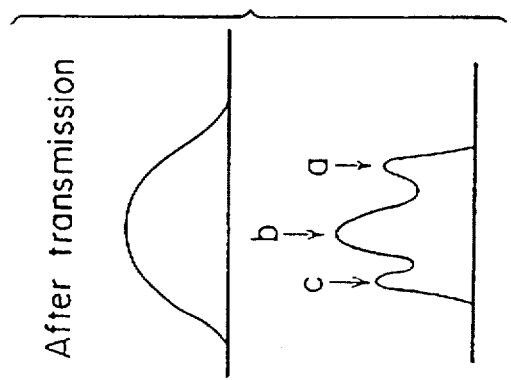
Figure 16A:
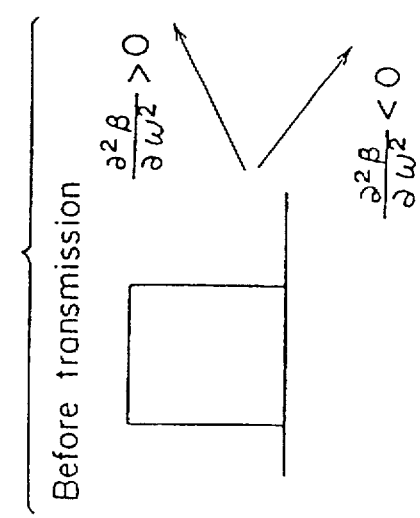

(1) Waveform distortion due to effect of chromatic dispersion and optical Kerr effect Consider cases where unchirping optical pulses are transmitted through dispersion media. As shown in FIG. 15, in the case of a normal dispersion medium ($\partial^2 \beta / \partial \omega^2 > 0$), pulses each shift towards the low frequency side at leading edges and towards the high frequency side at trailing edges (the so-called up-chirping). In the case of an anomalous dispersion medium ($\partial^2 \beta / \partial \omega^2 < 0$), pulses each shift towards the high frequency side at leading edges and towards the low frequency side at trailing edges (i.e., down-chirping). The longer the wavelength, the higher the group velocity with the normal dispersion medium; the shorter the wavelength, the higher the group velocity with the anomalous dispersion medium. In either case, the pulse width is widened. Where the intensity of light is high, the refractive index thereof is varied by the amount given below because of the optical Kerr effect:

$$\Delta n(t) = n_2 |E(t)|^2 \quad (21)$$

where, $n_2 = \chi^{(3)}/2\epsilon_0 n$ is a quantity called nonlinear refractive index. The nonlinear refractive index is about $3.2 \times 10^{-16} \text{cm}^2/\text{W}$ in the case of silica optical fibers. When optical pulses are subjected to the optical Kerr effect, the spectrum thereof is diffused by the amount given below:

$$\Delta \omega(t) = -\frac{\partial \Delta \phi(t)}{\partial t} = -\frac{2\pi n_2}{\lambda} \frac{\partial |E(t)|^2}{\partial t} \Delta z \quad (22)$$

where, $\Delta z$ is an interactive length. The phenomenon is called self-phase modulation (SPM). It is SPM that causes optical pulses to shift toward the low frequency side at leading edges and towards the high frequency side at trailing edges (up-chirping). When the optical pulses are subjected to the optical Kerr effect in a dispersion medium, the pulses are diffused if the medium is a normal dispersion medium, or compressed if the medium is an anomalous dispersion medium. Given the above-described effect of chromatic dispersion, large pulse dispersion occurs in the normal dispersion medium. In the case of the anomalous dispersion medium, the pulse dispersion due to chromatic dispersion and the pulse compression caused by SPM offset each other, leaving a portion of whichever is the greater of the two effects. Optical soliton pulses keep the two effects balanced. It has been generally considered desirable to supplement the pulse dispersion of the anomalous dispersion medium with SPM-based pulse compression. Today, this is no longer necessarily true for two reasons: because signal transmission with optical power at high levels is made available by use of optical amplifiers, and because dispersion shifted fibers developed recently have made relatively small chromatic dispersion values feasible. In other words, too much pulse compression can lead to large waveform distortion. In particular, NRZ pulses involve pulse compression occurring only at leading and trailing edges. This can result in abrupt waveform changes and, in extreme cases, a trailing edge overtaking a leading edge so that each pulse is divided into three parts, as depicted in FIG. 16. Problems of this kind are bypassed effectively by use of the present invention.

FIG. 17 is a block diagram of a system that compensates for the waveform distortion caused by dispersion as well as for the waveform distortion caused by SPM. (In this setup, transmission lines are made of an anomalous dispersion medium.) The constitution of the system is the same as that of FIG. 1. In FIG. 17, PC stands for a phase conjugate light generator. To compensate for chromatic dispersion alone requires simply making the total dispersion values of the two transmission lines identical. However, in order to compensate for the effect of SPM as well, it is preferable to control the nonlinear refractive indices of the transmission lines as well as the optical power values thereof. In that case, the signal light and phase conjugate light are inverted in spectrum. This provides compensation not only for dispersion-caused waveform distortion but also for waveform distortion attributable to SPM. The condition for chromatic dispersion compensation is given by Expression (13). The condition for SPM compensation is furnished as described below.

The term resulting from the optical Kerr effect is considered when Expression (5) is developed into Expression (6). This in turn transforms Expressions (6), (7), (10), (11) and (12) into Expressions (6'), (7'), (10'), (11') and (12') respectively as follows:

$$\beta(\omega_S + \Omega) = \beta(\omega_S) + \frac{\partial \beta(\omega_S)}{\partial \omega} \Omega + 1/2 \frac{\partial^2 \beta(\omega_s)}{\partial \omega^2} \Omega^2 + \frac{\omega_s n_{21}}{cA_{\textit{eff}_1}} \overline{P}_s \quad (6')$$

$$E_{S2}(t) = \int_{-\infty}^{\infty} F(\Omega) \exp\left[ i(\omega_S + \Omega)t - \int_0^{L_1} \beta(\omega_S + \Omega) dz \right] d\Omega = \quad (7')$$

$$\exp[i(\omega_S t - \beta_0 L_1)] \int_{-\infty}^{\infty} F(\Omega) \exp\left[ i \left[ \Omega \left( t - \frac{\partial \beta(\omega_S)}{\partial \omega} L_1 \right) \right] \right] \times$$

$$\exp\left[ -i \left[ 1/2 \frac{\partial^2 \beta(\omega_s)}{\partial \omega^2} \Omega^2 L_1 + \int_0^{L_1} \frac{\omega_s n_{21}}{cA_{\textit{eff}_1}} \overline{P}_s dz \right] \right] d\Omega$$

$$E_{C1}(t) = \exp[i(\omega_c t + \beta_0 L_1)] \int_{-\infty}^{\infty} T(\Omega) F^* \quad (10')$$

$$(\Omega) \exp\left[ i \left[ -\Omega \left( t - \frac{\partial \beta(\omega_S)}{\partial \omega} L_1 \right) \right] \right] \times$$

$$\exp\left[ i \left[ 1/2 \frac{\partial^2 \beta(\omega_s)}{\partial \omega^2} \Omega^2 L_1 + \int_0^{L_1} \frac{\omega_s n_{22}}{cA_{\textit{eff}_1}} \overline{P}_s dz \right] \right] d\Omega$$

$$\beta'(\omega_c - \Omega) = \quad (11')$$

$$\beta'(\omega_c) - \frac{\partial \beta'(\omega_c)}{\partial \omega} \Omega + (1/2) \frac{\partial^2 \beta'(\omega_c)}{\partial \omega} \Omega^2 + \frac{\omega_c n_{22}}{cA_{\textit{eff}_2}} \overline{P}_c$$

$$E_{C2}(t) = \exp[i(\omega_c t + \beta_0 L_i - \beta'_0 L_1)] \int_{-\infty}^{\infty} T(\Omega) F^* \quad (12')$$

$$(\Omega) \exp\left[ i \left[ -\Omega \left( t - \frac{\partial \beta(\omega_s)}{\partial \omega} L_1 - \frac{\partial \beta'(\omega_c)}{\partial \omega} L_2 \right) \right] \times \right.$$

$$\exp[i[\Phi_1(\Omega, L_1) - \Phi_2(\Omega, L_2)]] d\Omega$$

where $$\Phi_1(\Omega, L_1) = (1/2)\Omega^2 \frac{\partial^2 \beta(\omega_s)}{\partial \omega^2} L_1 + \int_0^{L_1} \frac{\omega_s n_{21}}{cA_{\textit{eff}_1}} \overline{P}_s dz \quad (23)$$

$$\Phi_2(\Omega, L_2) = (1/2)\Omega^2 \frac{\partial^2 \beta'(\omega_c)}{\delta \omega^2} L_2 + \int_{L_1}^{L_2} \frac{\omega_c n_{22}}{cA_{\textit{eff}_2}} \overline{P}_c dz \quad (24)$$

Thus if the nonlinear effect (i.e., optical Kerr effect) is small enough to be negligible, satisfying the condition of Expression (13) compensates for chromatic dispersion.

If the optical Kerr effect cannot be ignored, the pulse waveform is deformed due to chromatic dispersion and the nonlinear action of the optical Kerr effect. Pulse waveform distortion is compensated for by making $\Phi_1$ ($\Omega$, $L_1$) of Expression (23) equal to $\Phi_2(\Omega, L_2)$ of Expression (24). Suppose that the adverse influences are compensated individually as the simplest kind of approximation. In this case, chromatic dispersion is compensated for in the same manner as described above. The influence of the optical Kerr effect is compensated for when the following condition is met:

$$\int_0^{L_1} \frac{\omega_s n_{21}}{cA_{\textit{eff}_1}} \overline{P}_s dz = \int_{L_1}^{L_2} \frac{\omega_c n_{22}}{cA_{\textit{eff}_2}} \overline{P}_c dz \quad (25)$$

If $\alpha_1$ stands for the loss factor of a first optical fiber (corresponding to the optical transmission line 2 of FIG. 1) and $\alpha_2$ denotes the loss factor of a second optical fiber (corresponding to the optical transmission line 4 of FIG. 1), one gets:

$$P_S(z) = P_S(0) \exp(-\alpha_1 z) \quad (26)$$

$$P_C(z) = P_C(L_1) \exp(-\alpha_2 (z - L_2)) \quad (27)$$

Thus the necessary condition is given by the following Expression (28):

$$\frac{\omega_s n_{21} \overline{P}_s L_1}{A_{\textit{eff}_1}} = \frac{\omega_c n_{22} \overline{P}_c L_2}{A_{\textit{eff}_2}} \quad (28)$$

where, $\overline{P}_S$ stands for the mean power of the signal light in the first optical fiber, and $\overline{P}_C$ for the mean power of the phase conjugate light in the second optical fiber. That is, $\overline{P}_S$ and $\overline{P}_C$ are furnished by the following Expressions (29) and (30):

$$\overline{P}_s = \frac{1 - \exp(-\alpha_1 L_1)}{\alpha_1 L_1} P_s(0) \quad (29)$$

$$\overline{P}_c = \frac{1 - \exp(-\alpha_2 L_2)}{\alpha_2 L_2} P_c(L_1) \quad (30)$$

It is thus possible to compensate for the pulse waveform distortion due to the optical Kerr effect when, with chromatic dispersion offset by satisfying Expression (13), the product of the nonlinear refractive index, intensity of light $$\left( \frac{\overline{P}_s}{A_{\textit{eff}_1}}, \frac{\overline{P}_c}{A_{\textit{eff}_2}} \right),$$

optical frequency, and fiber length of the first optical transmission line is made the same as the product of the same parameters of the second optical transmission line. In the expressions above, $n_{21}$ and $n_{22}$ stand for the nonlinear refractive indices of the first and the second optical fibers, respectively; $A_{\textit{eff}_1}$, $A_{\textit{eff}_2}$ denote the effective core area of the first and second optical fibers, respectively.

It can be seen from Expression (28) that if two transmission lines have the same nonlinear refractive index and effective core area and are identical in the frequencies of the signal light and phase conjugate light (degenerate FWM: $\omega_S=\omega_C$), all that needs to be done in theory is to make the two lines identical in terms of length and mean intensity of light. In practice, however, the various parameters differ subtly and the signal light is different from the phase conjugate light in input waveform (because the phase conjugate light is linearly converted light of a distorted waveform). This means that the various optical pulses differ in terms of peak power, with the result that the magnitude of the optical Kerr effect varies and the compensation therefor is limited. In a practical setup, the parameters (especially mean intensity of light and fiber length) are preferably optimized (in consideration for consistency with the compensation for chromatic dispersion).

If the transmission line loss is considerably high, there occurs an appreciable optical power intensity variation in the transmission lines. This leads to a significant deviation from the property of time reversal with respect to the optical Kerr effect upstream and downstream of the PC. As a result, the compensation becomes insufficient. In that case, it is preferable to compensate for small losses with small gains by furnishing a number of optical amplifiers halfway along the transmission lines so that intensity fluctuation is minimized. This makes it possible to satisfy the conditions closely resembling the above described approximations based on mean intensity, whereby adequate compensation is made available. If there is no transmission line loss or if the transmission line loss is compensated using a distributed optical amplifier arrangement during transmission, the condition for time reversal is met. It is thus evident that ideal compensation for waveform distortion is carried out. Although the setup of FIG. 17 uses the PC as a repeater set up halfway along the transmission lines, the invention is not limited thereby. Alternatively, the PC may be set up near the receiver and used as a preamplifier. The preamplifier is easer to maintain than the repeater that is usually set up far away from the transmitter or receiver. A typical system in which the influences of chromatic dispersion and the optical Kerr effect are compensated will be described later.

Derived from Expression (13) is the expression below wherein the value of dispersion is replaced with the usually employed D value. Thus one gets:

$$D_1 L_1 \lambda_s^2 = D_2 L_2 \lambda_c^2 \quad (31)$$

$$D = -\frac{2\pi c}{\lambda^2} \frac{\partial^2 \beta}{\partial \omega^2} \quad (32)$$

where, $\lambda_S$ and $\lambda_C$ denote the wavelengths of signal light and phase conjugate light, respectively.

For example, suppose that $\omega_S + \omega_C$, that the first optical transmission line is a dispersion shift fiber with $D_1=1.8$ ps/nm/km, and that the second optical transmission line with $D_2=18$ ps/nm/km. This arrangement is readily implemented when a dispersion shift optical fiber of a 1,550 nm band is used in the anomalous dispersion region while a single mode optical fiber of a 1,310 nm band is used in the 1,550 nm band. In the above arrangement, $L_2$ is set for about 1/10 of $L_1$ based on Expression (31) because $D_2/D_3=10$. That is, if $L_1=100$ km, then $L_2=10$ km; if $L_1=1,000$ km, then $L_2=100$ km. In this case, if the two optical fibers are not much different in terms of nonlinear refractive index, the compensation for the waveform distortion due to the optical Kerr effect is accomplished when the mean optical intensity of the phase conjugate light in the second optical transmission line is set for about 10 times the mean optical intensity of the signal light in the first optical transmission line. If the mean optical intensity of phase conjugate light is substantially the same as that of signal light, the nonlinear refractive index may be set so as to satisfy Expression (28) depending on the difference in length between the first and the second optical transmission lines. Known optical fibers having large nonlinear refractive indices include the chalcogenite glass fiber.

(2) Waveform distortion caused by random phase fluctuation due to ASE noise in optical amplifiers Where signal light is composed of intensity- or amplitude-modulated optical pulses, the pulse waveform can be distorted by something other than chromatic dispersion. That phenomenon is particularly pronounced in a multiple-stage optical amplifier and repeater setup involving numerous optical amplifiers. Measures to deal with the trouble have been urgently called for.

FIG. 18 is a block diagram of an optical amplifier and repeater system to which the invention is applicable. In FIG. 18, the signal light output from the optical transmitter 1 passes through the optical transmission line 2 having at least one optical amplifier 101 interposed therein, to reach an optical repeater 102. The signal light is shaped in waveform, amplified and retimed by the optical repeater 102 before being sent to the optical receiver 5 through the optical transmission line 4 having at least one optical amplifier 103 interposed therein. As described earlier, the chromatic dispersion involved is compensated for when the optical repeater 102 includes the phase conjugate light generation means 3 (see FIG. 1). Where the distance of transmission is appreciably long, one or a plurality of optical amplifiers are used to forward the signal light as shown in FIG. 18. In such a case, minute amplitude fluctuation caused by associated spontaneous emissions (ASE) from the optical amplifiers is added to the signal light. Also taking place is the randomizing of phase shift caused by the optical Kerr effect due to the power of the signal light itself (i.e., self-phase modulation), along with the FWM of ASE pumped by the signal light. These factors contribute to dispersing the spectrum of the signal light. The result of this is pulse waveform distortion. The nonlinear effect of the phenomenon is an object of intense studies on long-distance signal transmission systems such as intercontinental submarine optical fiber transmission systems. One proposal made so far involves minimizing the power of signal light as well as the gains of optical amplifiers. Another proposal envisages using narrow-band optical filters to reduce ASE. Significantly effective countermeasures have yet to be proposed.

Figure 19:
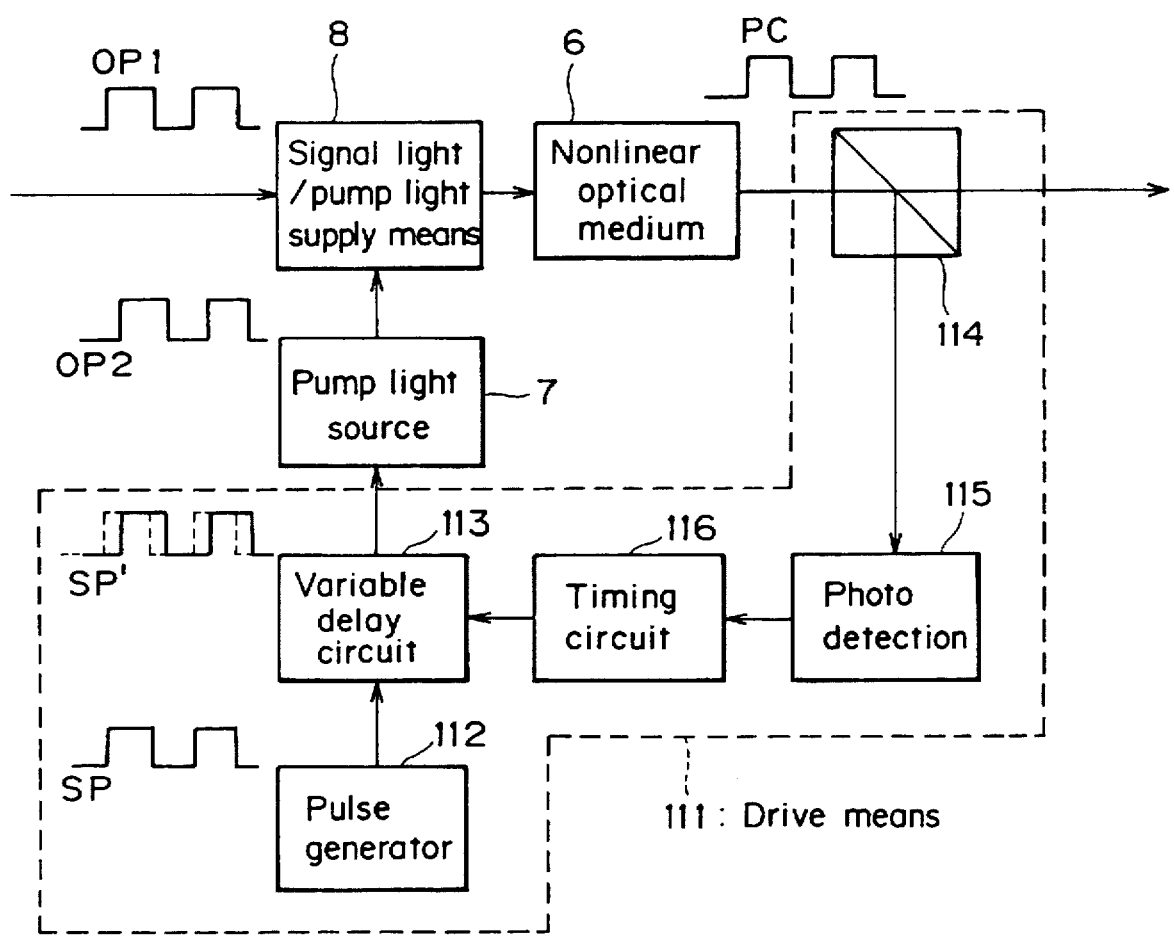
FIG. 19 is a block diagram of a phase conjugate light generator applicable to the system of FIG. 18.

FIG. 19 is a block diagram of a phase conjugate light generator applicable to the system of FIG. 18. As with the phase conjugate light generation means 3 of FIG. 1, the phase conjugate light generator of FIG. 19 comprises the nonlinear optical medium 6, pump light source 7, and signal light/pump light supply means 8. In this example, the signal light composed of optical pulses OP1 is fed to the nonlinear optical medium 6 via the signal light/pump light supply means 8, and the pump light source 7 supplies the nonlinear optical medium 6 with the pump light made of optical pulses OP2 through the signal light/pump light supply means 8. The optical pulses OP1 and OP2 are kept in synchronism. The pulse synchronism is accomplished using drive means 111 for driving the pump light source 7 for synchronization purposes.

A typical constitution of the drive means 111 includes a pulse generator 112 for outputting reference pulses SP, a variable delay circuit 113 for delaying the reference pulses SP by an adjusted delay time and for supplying the delayed reference pulses to the pump light source 7, an optical branching circuit 114 for branching into first and second branched light the phase conjugate light output from the nonlinear optical medium 6, a photo detection circuit 115 for receiving the first branched light to detect the mean power thereof, and a timing circuit 116 for adjusting the delay time of the variable delay circuit 113 so as to maximize the mean power detected by the photo detection circuit 115. The second branched light from the optical branching circuit 114 is transmitted to the optical transmission line 4 (see FIG. 18 and others). The power of the first branched light may be sufficiently lower than that of the second branched light. Specific workings of the drive means 111 will be described later. Applying the phase conjugate light generator of FIG. 19 to the optical repeater 102 in FIG. 18 provides not only compensation for chromatic dispersion but also waveform shaping, retiming and amplification. To compensate effectively for chromatic dispersion requires making the total amounts of dispersion in the optical transmission lines 2 and 4 substantially the same. Illustratively, the number of optical amplifiers 101 is made the same as that of optical amplifiers 103. The setup of FIG. 19 may be located close to the optical receiver 5 on the optical transmission line connected to the optical transmitter 1. In that case, the setup of FIG. 19 functions as a high-performance preamplifier because it receives the light immediately following waveform shaping and other processes. Alternatively, the setup of FIG. 19 may be included in the optical receiver 5. An example of this arrangement will be described later. Although FIG. 18 shows only one optical repeater 102, a plurality of optical repeaters may be set up halfway through the optical transmission line connecting the optical transmitter 1 with the optical receiver 5.

How the phase conjugate light generator of FIG. 19 provides waveform shaping will now be described in detail. As evident from the description regarding FIG. 2 as well as from Expressions (14) through (20), FWM causes the pump light $E_P$ and signal light $E_S$ to interact within the nonlinear optical medium, generating substantially excited waves proportionate to $E_P E_S^*$. This in turn diffracts the pump light $E_P$ of itself in the direction of $k_I=2k_P-k_S$, producing idler light (phase conjugate light) $E_I$. As a result, the complex amplitude $A_I(t)$ of the idler light $E_I$ is given by the following expression:

$$A_1(t) \propto \chi^{(3)} A_{P1}(t) A_{P2}(t) A_S^*(t) \quad (33)$$

where, $A_{P1}(t)$ and $A_{P2}(t)$ represent two complex amplitudes of pump light pulses. The pump light pulses have two complex amplitudes because the action of the pump light corresponds to two photon processes. That is, the pump light is equivalent to two light waves during FWM. From Expression (33), it can be seen that the idler light (phase conjugate light) is generated in a region where signal light pulses and pump light pulses overlap. The generated idler light (phase conjugate light) $I_1(t)$ is given by the following expression:

$$I_1(t) = G_{10} |A_{P1}(t+t_1) A_{P2}(t+t_2) A_S^*(t)|^2 \quad (34)$$

where, $G_{10}$ denotes the gain of the idler light, and $t_1$ and $t_2$ stand for the time difference of the pump light pulses with respect to the signal light pulses. Where there is one pump light source, the value $t_1$ is identical to the value $t_2$. In a generally practiced setup involving two pump light sources, the values $t_1$ and $t_2$ do not necessarily match. It is assumed here that the pulse width of pump light pulses is sufficiently longer than the response time of the nonlinear optical medium. In that case, the response obtained from the medium is adequate so that the induced polarization due to nonlinear interaction between light waves and phase conjugate light attains a steady value. Therefore, the pulse width of the generated phase conjugate light is equal to or narrower than the pulse width of probe light (signal light). Where pump light pulses are symmetrical in waveform, the pulse waveform of the generated phase conjugate light tends to be symmetrical even if the pulse waveform of the supplied signal light is asymmetrical. This is verified by assuming FWM involving signal light pulses with full width at half maximum (FWHM) of $T_S$ and square wave pump light pulses with a pulse width of $T_P$. It is also assumed that the center of each pulse coincides temporally with each other ($t_1=t_2=0$). Given the above assumptions, the following expression is derived from Expression (34):

$$I_I(t) = \begin{cases} G_{10}|A_S^*(t)|^2 & (|\tau| < T_P/2) \\ 0 & (|\tau| > T_P/2) \end{cases} \quad (35)$$

where, $\tau$ denotes the time difference from the center of pump pulse. The intensity of the pump light pulses is normalized for the sake of simplicity. The results from Expression (35) are illustrated in FIGS. 20 and 21.

FIG. 20 is a view of various optical pulse waveforms in effect when the pulse width of the pump light is substantially the same as or greater than that of the signal light. In FIG. 20, waveforms (A), (B) and (C) belong to signal light pulses, pump light pulses and phase conjugate light pulses, respectively. When the pulse width of the pump light is about the same as that of the signal light, the pulse waveform of the phase conjugate light generated coincides substantially with the pulse waveform of the supplied signal light. When the pulse width of the pump light is greater than that of the signal light, the pulse waveform of the phase conjugate light substantially matches that of the signal light.

FIG. 21 is a view of pulse waveforms in effect when the pulse width of the pump light is narrower than that of the signal light. In FIG. 21, waveforms (A), (B) and (C) belong to signal light pulses, pump light pulses and phase conjugate light pulses, respectively. When the pulse width of the pump light is narrower than that of the signal light, the waveform of the phase conjugate light generated is limited in width by the pulse width of the pump light. Thus where the phase conjugate light is generated in accordance with the signal light, the pulse width may be reduced for waveform shaping.

Although the description above in connection with FIGS. 20 and 21 assumes the pulse waveforms of the pump light in use to be simple square waves, the invention is not limited thereby. Alternatively, the invention provides waveform shaping on signal light using pump light of any pulse waveforms.

Where pulse waveform shaping is to be carried out based on the principle described in connection with FIG. 21, it is necessary to synchronize the supplied pump light with the signal light fed to the nonlinear optical medium. How such synchronization is illustratively achieved by the drive means 111 (see FIG. 19) will now be described. The reference pulses SP output by the pulse generator 112 are delayed by the amount adjusted by the variable delay circuit 113. The resulting reference pulses SP', with their timing thus adjusted, are fed from the variable delay circuit 113 to the pump light source 7. The pump light source 7, illustratively made of a laser diode, outputs pump light pulses OP2 in synchronism with the delayed pulses supplied. With the signal light pulses OP1 and pump light pulses OP2 sent to the nonlinear optical medium 6, the medium 6 outputs phase conjugate light pulses PC only if the two streams of the incoming pulses coincide with each other on the time base. Part of the phase conjugate light pulses PC output from the nonlinear optical medium 6 is branched by the optical branching circuit 114. The mean power of the branched light is detected by the photo detection circuit 115. When the signal light pulses OP1 and pump light pulses OP2 are in complete synchronism, the mean power detected by the photo detection circuit 115 is maximized. That is, the signal light pulses OP1 and pump light pulses OP2 are kept in synchronism by having the timing circuit 116 get the variable delay circuit 113 to adjust appropriately the timing of the reference pulses SP. Another example of practicing the drive means 111, not shown, involves extracting the clock component from the signal light pulses supplied so that the pump light source 7 is driven according to that clock component. If the signal light pulses are soliton pulses (to be described later), pulse splitting fluctuates because of the interaction between pulses, making clock component extraction difficult. That difficulty can be circumvented by use of the example of the drive means 111 in FIG. 19.

FIG. 22 is a view of optical pulse waveforms in effect when the signal light from the optical transmitter of FIG. 18 is in NRZ code. The optical repeater 102 in the optical amplifier and repeater system of FIG. 18 is assumed to have the phase conjugate light generator of FIG. 19. In FIG. 22, a waveform (A) belongs to the signal light pulses transmitted from the optical transmitter 1; a waveform (B) to the signal light pulses received by the optical repeater 102; a waveform (C) to the pump light pulses supplied by the optical repeater 102; and a waveform (D) to the phase conjugate light pulses output by the optical repeater 102.

Where the signal light pulses are NRZ pulses having a bit rate B and a width T (T=1/B), the pulse width T" of the generated phase conjugate light pulses is made narrower than the width T by use of pump light pulses that are all-on RZ pulses having the same bit rate B and a pulse width T' (T'<T). As the waveform (B) of FIG. 22 indicates, waveform shaping can be made so that T"≈1/B if the pulse width of the repeater-received signal light pulses is wider than that of the transmitted signal light pulses under the influence of chromatic dispersion and SPM. Although the timing of the repeater-received signal light pulses is subtly diverged in many cases, the divergence is corrected by the waveform shaping process of FIG. 22.

FIG. 23 is a view of optical pulse waveforms in effect when the signal light is in RZ code. The waveforms (A) through (D) in FIG. 23 correspond to those in FIG. 22. Where the signal light pulses are RZ pulses having a bit rate B and a width T, the pulse width T" of the generated phase conjugate light pulses is made narrower than the width T by use of pump light pulses that are all-on RZ pulses having the same bit rate B and a pulse width T' (T'≦T). Waveform shaping can be made so that T"≈d/B (d: duty ratio) if the pulse width T of the repeater-received signal light pulses is wider than the initial setting d/B of the transmitted signal light pulses under the influence of chromatic dispersion and SPM. A primary benefit from the above-described waveform shaping is an improved S/N ratio. In optical transmission systems utilizing coherent light, the S/N ratio (so called shot noise limit) determined by quantum noise is preserved despite the loss incurred. Thus the deterioration of the S/N ratio for the transmitted signal upon detection by receiver is attributed mainly to the added noise in the optical transmission line, to the interference between adjacent pulses, or to the thermal noise in the receiver. The added noise is composed primarily of the ASE noise emitted by optical amplifiers. The interference between adjacent pulses is derived principally from the waveform distortion caused by chromatic dispersion or by SPM. Some phase conjugate light generators incorporate their own amplifying functions that add further to the noise. However, because the waveform shaping performed by the phase conjugate light generator reduces the noise of interference between adjacent pulses, the S/N ratio may be improved thereby. How this can be achieved is illustrated in FIG. 24.

FIG. 24 is a view describing typical effects of waveform shaping. In FIG. 24, a waveform (A) denotes repeater-received optical pulses whose waveform is degraded, and a waveform (B) represents phase conjugate light pulses whose waveform is shaped. As indicated, the interference noise may be suppressed by the waveform shaping process.

Another benefit from the waveform shaping effected by the present invention is that it permits correction of the fluctuation of repeater-received signal light pulses on the time base, whereby retimed phase conjugate light pulses are generated. When the phase conjugate light pulses are transmitted to the receiving side, the phase margin may be enlarged upon reception.

Today, intense studies are underway on optical soliton communication technologies. In an optical soliton communication setup, the signal light is subject to a phase shift proportionate to its own electric field squared. In an optical amplifier and repeater system operating on the optical soliton communication, random phase modulation due to the random intensity modulation caused by the ASE of the optical amplifiers configured generates random group velocity fluctuation of the pulses. That in turn leads to timing divergence of the received pulses, degrading the transmission characteristics. The limit imposed by the transmission characteristic degradation on the product of transmission speed and transmission distance is called the Gordon-Haus limit. The Gordon-Haus limit defines the constraints on optical soliton communication. Although a number of measures have been proposed to bypass the Gordon-Haus limit, they are all too "tricky" to be implemented in practice. By contrast, the present invention corrects the pulse timing as described and thus is capable of realizing optical soliton transmission systems that go beyond the Gordon-Haus limit. How this is done will now be described with reference to FIG. 25.

FIG. 25 is a view of optical pulse waveforms in effect when the signal light is composed of soliton pulses. In FIG. 25, a waveform (A) stands for transmitted signal light pulses, a waveform (B) for repeat received signal light pulses, a waveform (C) for pump light pulses, a waveform (D) for phase conjugate light pulses, and a waveform (E) for output constant pulses. The signal light output by the optical transmitter is assumed to be composed of soliton pulses having a bit rate B. If the timing fluctuates upon transmission of the signal light so that the bit rate becomes B+ΔB, pump light pulses made of all-on RZ pulses having the same bit rate B may be used to generate phase conjugate light pulses composed of soliton pulses with their timing fluctuation smaller than ΔB. In that case, the peaks of the generated phase conjugate light pulses are dependent on the divergence in timing between signal light pulses and pump light pulses. Thus the dispersed peaks (see waveform (D) of FIG. 25) of the phase conjugate light pulses are compensated using output constant optical amplifiers. This type of optical amplifier includes a fiber type optical amplifier in the output saturated region. Alternatively, the output of the optical amplifier may be kept constant through feedback of a high response semiconductor type optical amplifier to the drive current. As another alternative, an output constant optical amplifier may be set up by combining a saturable absorber with a linear optical amplifier and/or by applying nonlinear optical effects.

FIG. 26 is a block diagram of a system devised as an improvement over the system of FIG. 18, the improved system being better suited for remote control. As with the system in FIG. 18, the system of FIG. 26 has the phase conjugate light generator of FIG. 16 applied to an optical repeater 102'. What characterizes this system is that it uses as its pump light source a soliton light source 121 set up in a remote location. In principle, the pump light pulses for the above-described waveform shaping should be as properly shaped in waveform as possible and should have as high power as possible. Meanwhile, multiple-stage optical amplifier and repeater setups often involve establishing a plurality of optical repeaters in difficult-to-access locations (e.g., deep in the mountains or on the seabed). These optical repeaters need to be monitored, preferably in as simplified fashion as possible. Given these requirements, if the phase conjugate light generator of this invention is incorporated in remotely located optical repeaters, the pump light source for generating pump light pulses needs to be of a type suitable for long-distance transmission. The pump light pulses should preferably be soliton pulses if the pulses are to be transmitted over long distances and still resist waveform degradation attributable to dispersion and other disturbances. Soliton pulses may be transmitted with their waveform intact through optical repeaters. This is because the soliton pulses are transmitted while being balanced with the chromatic dispersion and SPM in the optical fiber used. It should be noted, however, that the pulse width of soliton pulses widens as the power drops. Thus it is preferable to take appropriate measures to counter the phenomenon if the distance of transmission is long enough to require the system to deal with the loss in the optical fiber. One such measure is to make in advance the pulse width of the soliton light source 121 narrower than required. Another measure involves setting up optical amplifiers halfway through the optical transmission line for pump light pulse transmission in order to compensate for the transmission loss. The soliton light source is constructed by resorting to the known techniques disclosed illustratively in the following references:

(1) G. Eisenstein et at., "Active mode-locking characteristics of InGaAsP single mode fiber composite cavity lasers," IEEE J. Quantum Electron., Vol. QE-22, pp. 142–148, 1986.

(2) R. S. Tucker et al., "40 GHz active mode-locking in a 1.5 µm monolithic extended-cavity laser," Electron. Lett., Vol. 25, pp. 621–622, 1989.

(3) M. C. Wu et al., "Transform-limited 1.4 ps optical pulses from a monolithic colliding-pulse mode-locked quantum well laser," Appl. Phys. Lett., Vol. 57, pp. 759–761, 1990.

(4) M. Suzuki et al., "Transform-limited 14 ps optical pulse generation with 15 GHz repetition rate by InGaAsP electroabsorption modulator," Electron. Lett., Vol. 28, pp. 1007–1008, 1992.

(5) K. Iwatsuki et al., "Generation of transform-limited gain-switched DFB-LD pulses <6 ps with linear fiber compression and spectral window," Electron. Lett., Vol. 27, pp. 1981–1982, 1992.

(6) K. Smith et al., "Totally integrated erbium fiber soliton laser pumped by laser diode," Electron. Lett., Vol. 27, pp. 244–246, 1991.

(7) D. J. Richardson et al., "Pulse repetition rates in passive, self-starting, femtsecond soliton fiber laser," Electron. Lett., Vol. 27, pp. 1451–1453, 1991.

(8) S. V. Chernikov et al., "Tunable source of 4 ps to 230 fs solitons at repetition rates from 60–200 Gbit/s," OAA '92, Paper PD7, 1992.

The phase conjugate light generator of this invention may also be applied to the splitting of the optical pulses (DEMUX) having undergone time division multiplex (TDM). As optical pulses become faster, they approach the critical operating speeds of electronics for actually carrying out modulation and demodulation. One way to overcome such limits is the method called optical TDM. This method takes advantage of the fact that optical devices have sufficiently wide band widths. Specifically, as shown in FIG. 27, optical pulses on one channel are allowed to join those on another channel while the former pulses are adjusted in timing. Signal light pulses OP 11 from one signal light generator 131 are sent to the optical transmission line 2 via an optical multiplexer 134 made of an optical coupler or the like. Signal light pulses from another signal light generator 132 are output to the optical transmission line 2 via an optical delay circuit 133 capable of varying delay time and via an optical multiplexer 134.

If the signal light pulses OP11 and OP12 have the same speed, properly setting the delay time of the optical delay circuit 133 allows the signal light pulses OP13 sent to the optical transmission line 2 to be twice as fast as the signal light pulses OP11 and OP12. Thus the optical transmitter of FIG. 27 is suitable for high-speed transmission. In theory, repeating the optical TDM process should boost transmission speed indefinitely. However, no matter how fast the generated signal light pulses may become, they are meaningful only if they successfully undergo optical pulse splitting (DEMUX) by optical receiver. It is to this type of optical pulse splitting that the phase conjugate light generator of this invention is applied. How this is accomplished will now be described in more detail.

FIG. 28 is a block diagram of an optical receiver suitable for splitting TDM (time division multiplexed) optical pulses. Illustratively, the high-speed signal light pulses OP13 generated by the optical transmitter of FIG. 27 are fed to the nonlinear optical medium 6 via the signal light/pump light supply means 8 made of a optical coupler or the like. Pump light pulses OP14 fed from the pump light source 7 to the nonlinear optical medium via the signal light/pump light supply means 8 have a speed proportionate to the reciprocal number of the multiplex number involved (2 in this example). As with the phase conjugate light generator of FIG. 19, the pump light source 7 is driven by the reference pulses SP from the pulse generator 112. In this case, the reference pulses SP are adjusted in speed so that the above-described pump light pulses OP14 are obtained. Given the signal light pulses OP13 made of time division multiplexed low-speed optical pulses on a plurality of channels, the above arrangement generates phase conjugate light pulses PS based on only the low-speed optical pulses that are in synchronism with the pump light pulses OP14. That is, a desired type of low-speed pulses may be extracted selectively. In other words, time division multiplexed optical pulses can be split in this manner. The phase conjugate light PC corresponding to the selectively extracted low-speed optical pulses is branched by the optical branching circuit 114 into two streams. One branched light reaches the receiver 141 wherein data is reproduced. The other branched light goes to the photo detection circuit 115. The photo detection circuit 115 operates, according to the principle described in connection with FIG. 16, to adjust the timing of the reference pulses SP so as to eliminate any divergence of synchronism between the pump light pulses OP14 and the signal light pulses OP13.

Described below with reference to FIGS. 29 and 30 are those embodiments of the phase conjugate light generator which keep the efficiency of generating phase conjugate light constant regardless of the polarized state of the signal light supplied. Any of these phase conjugate light generators may be used as the phase conjugate light generation means 3 in the system of FIG. 1, and may be applied to the apparatus of FIG. 19 or to the optical receiver of FIG. 28.

FIG. 29 is a block diagram of the eighth embodiment of the phase conjugate light generation means according to the invention. A optical coupler 151 acts as the signal light/pump light supply means and a polarization maintaining optical fiber 152 as the nonlinear optical medium. The supplied signal light and the pump light from the pump light source 7 join at the optical coupler 151 before entry into the polarization maintaining optical fiber 152. In this example, the pump light is composed of substantially linear polarized waves having a predetermined plane of polarization. The pump light source 7 is established and other arrangements are made so that predetermined plane of polarization is substantially at 45 degrees relative to the principal axis of the polarization maintaining optical fiber 152. This setup keeps two orthogonally polarized light components of the pump light power equal and constant, whereby the efficiency of generating phase conjugate light corresponding to the signal light of a desired polarized state is maintained at a stable level.

The embodiment of FIG. 29 is increasingly prone to produce a phase divergence as the polarization maintaining optical fiber 152 acting as the nonlinear optical medium becomes longer. The phase divergence is attributable to the polarization dispersion, that is a slight difference in refractive index between the two orthogonally polarized light components along the principal axis of the polarization maintaining optical fiber 152. Thus it is desirable to keep the optical fiber 152 as short as possible using one of two measures: either to raise the power of pump light, or to increase the nonlinear constant of the polarization maintaining optical fiber 152. The degree of polarization dispersion between the two orthogonally polarized light components is determined by the material and structure of the polarization maintaining optical fiber 152. On standard fibers, a dispersion of about 17 ps occurs over every 10 meters. This results in one-bit polarization dispersion for signal light having a bit rate of about 60 Gb/s. In that case, the transmission speed of the actually transmittable signal light is approximately 10 Gb/s. The longer the polarization maintaining optical fiber, the lower the transmission speed of the transmittable signal light.

Below is a description of how the invention is practiced illustratively to address signal light of high bit rates without shortening the polarization maintaining optical fiber as the nonlinear optical medium.

FIG. 30 is a block diagram of the ninth embodiment of the phase conjugate light generation means. Unlike the eighth embodiment of FIG. 29, the ninth embodiment has its nonlinear optical medium composed of two polarization maintaining optical fibers 152A and 152B of approximately the same length. The two optical fibers 152A and 152B are connected so that their principal axes are perpendicular to each other. The pump light is composed of substantially linear polarized waves having a predetermined plane of polarization. The source emitting such pump light is illustratively a laser diode. The signal light and pump light join at the optical coupler 151 before entry into a first end of a polarization maintaining optical fiber 152A. In this setup, the pump light source 7 is established and other arrangements are made so that the predetermined plane of polarization of the pump light is substantially at 45 degrees relative to the principal axis of the polarization maintaining optical fiber 152A. A second end of the polarization maintaining optical fiber 152A is connected to a first end of a polarization maintaining optical fiber 152B. A second end of the polarization maintaining optical fiber 152B emits the phase conjugate light generated in the optical fibers 152A and 152B. With the ninth embodiment, the polarization maintaining optical fibers 152A and 152B having substantially the same characteristic are equal in length. Thus any phase divergence that may occur between the two orthogonally polarized light components in the polarization maintaining optical fiber 152A is offset by the phase divergence between the two orthogonally polarized light components in the polarization maintaining optical fiber 152B. No matter how long the optical fibers 152A and 152B may become, the transmission speed of signal light is not limited thereby.

What follows is a description of some embodiments of the system shown in FIG. 17, i.e., the system wherein the adverse influences of chromatic dispersion and the optical Kerr effect are compensated according to the invention.

FIG. 31 is a block diagram of the first embodiment of the system in FIG. 17. This is a multiple-stage optical amplifier and repeater transmission system. A phase conjugate light generator is interposed between two adjacent optical repeaters on the transmission line. In this setup, the optical fiber portions upstream and downstream of each of the optical repeaters are used to compensate for pulse waveform distortion. More specifically, this embodiment is constituted as follows:

A plurality of phase conjugate light generators PC and a plurality of linear optical amplifiers LA are provided along the optical transmission line between an optical transmitter 1 and an optical receiver 5. In this example, the optical transmission line is composed of single mode optical fibers. Downstream of the optical transmitter 1 are N combinations of a single mode optical fiber SMF-m1, a phase conjugate light generator PC-m, a single mode optical fiber SMF-m2 and a linear optical amplifier LA-m each, arranged in that order (m: natural number). The chromatic dispersion of the single mode optical fiber SMF-m1 upstream of a given phase conjugate light generator PC is made to have the same sign and made substantially the same in magnitude as the chromatic dispersion of the single mode optical fiber SMF-m2 downstream of the same generator. This arrangement compensates for chromatic dispersion in cumulative fashion throughout the entire system. With chromatic dispersion thus compensated, the product of the mean intensity of light, optical frequency, and nonlinear refractive index of the single mode optical fiber SMF-m1 upstream of a given phase conjugate light generator PC-m is made the same as the product of the same parameters of the single mode optical fiber SMF-m2 downstream of that generator. Thus the embodiment compensates for both chromatic dispersion and the optical Kerr effect in cumulative fashion.

FIG. 32 is a block diagram of the second embodiment of the system in FIG. 17. With this embodiment, an optical transmitter 1' incorporates a single mode optical fiber SMF-1 as a first transmission line and a phase conjugate light generator PC. The single mode optical fiber SMF-1 receives output light of a wavelength of $\lambda_S$ and power P, from an optical modulator OM. In the figure, the length, chromatic dispersion, nonlinear refractive index of the single mode optical fiber SMF-1 and an effective core area are denoted by $L_1$, $D_1$, $n_{21}$, and $A_{\mathit{eff1}}$, respectively. The light fed to the phase conjugate light generator PC is converted to phase conjugate light having a wavelength of $\lambda_C$. The phase conjugate light is sent with power $P_2$ to the optical receiver 5 over a single mode optical fiber SMF-2 that acts as the second optical transmission line of this system. The length, chromatic dispersion and nonlinear refractive index and an effective core area of the single mode optical fiber SMF-2 are denoted by $L_2$, $D_2$, $n_{22}$, and $A_{\mathit{eff2}}$, respectively. This embodiment compensates for both chromatic dispersion and the optical Kerr effect by having the various parameters set so as to meet Expressions (28) and (31) given above. Where Expression (28) is applied, the optical frequencies $\omega_S$ and $\omega_C$ are proportional to the reciprocal numbers of the wavelengths $\lambda_S$ and $\lambda_C$ respectively. The optical receiver 5 of this embodiment receives undistorted optical pulses. Unlike setups where phase conjugate light generators PC are provided halfway along the transmission line as repeaters, the embodiment is freed from consideration for polarization dependency (i.e., the state of constant polarization is easy to maintain within the optical transmitter). When the system of FIG. 32 is to be implemented, the parameters $D_1$ and $n_{21}$ of the single mode optical fiber SMF-1 in the optical transmitter 1' should be made as large as possible. This makes it possible to install a long single mode optical fiber SMF-2 having relatively small parameters $D_2$ and $n_{22}$, whereby long-distance transmission is easier to implement.

FIG. 33 is a block diagram of the third embodiment of the system in FIG. 17. This embodiment is characterized in that an optical receiver 5' incorporates a phase conjugate light generator PC and a single mode optical fiber SMF-2 as the second optical transmission line, with an optical detector OD detecting the light output from the fiber SMF-2. In this case, the single mode optical fiber SMF-1 which is the first optical transmission line functions as the transmission line of this system. As with the embodiment of FIG. 32, the third embodiment of FIG. 33 is capable of compensating for both chromatic dispersion and the optical Kerr effect by having the various parameters set so as to satisfy Expressions (28)

and (31). Unlike the embodiment FIG. 32, this embodiment is required to have the optical receiver 5' provide against the polarization fluctuation occurring in the single mode optical fiber SMF-1. However, given the capability of the phase conjugate light generator PC to select the wavelength of pump light, the system of FIG. 33 is effective when applied illustratively to an optical frequency multiplexed transmission system.

The preceding three embodiments that compensate for chromatic dispersion and the optical Kerr effect are based on the principle of approximation whereby the optical pulse waveform distortion due to chromatic dispersion and the distortion due to SPM are compensated for independently. Results of experiments have shown that the compensation thus accomplished is explained in qualitative terms and the efficacy of the compensation is confirmed. However, to execute more strict compensation requires more detailed studies. The basis for conducting such studies is the fact that compensation using phase conjugate light utilizes the property of time reversal of the light. Whereas chromatic dispersion can be completely offset thanks to its steady characteristic, the degree of compensation for SPM is dependent on the intensity distribution over the optical transmission line because the optical Kerr effect depends on peak intensity of light. In this respect, time-reversed intensity distribution may be obtained where the transmission line loss is negligible or where a distributed optical amplifier arrangement is used. However, if a non-negligible transmission line loss is to be compensated using the most common lumped optical amplifier arrangement, the intensity distribution upstream and downstream of the phase conjugate light generator remains asymmetrical. This means that, in the strict sense, the property of time reversal does not hold for the optical Kerr effect. The electric field E of light propagates according to the wave equation. Where chromatic dispersion and the optical Kerr effect coexist, the light waves propagate while the two effects are influencing each other. In fact, where more precise discussions involving such factors as the light intensity fluctuation over the transmission line are to be made, the following nonlinear Schrodinger equation is known to afford a good explanation:

$$i\frac{\partial E}{\partial z} + 1/2 \frac{\partial^2 E}{\partial T^2} + |E|^2 E = i\Gamma E \tag{36}$$

where, (z, T) denotes the coordinate system that moves together with optical pulses and $\Gamma$ represents the attenuation constant. Furthermore, in phenomenal terms, the signs of the spectrum and chirping about the signal light and phase conjugate light are inverted upstream and downstream of the phase conjugate light generator. As mentioned earlier, pulse waveform distortion is attributable to the interaction between chirping and dispersion. Thus to compensate for SPM requires compensating for chirping. The condition for that compensation is given by the expression:

$$\frac{n_{21}}{\lambda_s} \int_0^{L_1} \frac{\partial}{\partial t} |E_s(z, t)|^2 dz = \int_{L_1}^{L_2} \frac{n_{22}}{\lambda_c} \frac{\partial}{\partial t} |E_c(z, t)|^2 dz \tag{37}$$

The trouble here is that the integral in the direction of transmission includes time differential. This indicates that the amount of chirping varies depending on optical amplitude fluctuation, i.e., on pulse waveform. It follows that the property of chirping time reversal does not hold in the strict sense if the power distribution of light is asymmetrical upstream and downstream of the phase conjugate light generator.

The relationship between optical power and electric field amplitude is given by the following expression:

$$|E|^2 = \frac{\varepsilon_0 c n}{2 A_{\text{eff}}} P \tag{38}$$

where, n denotes the linear refractive index. With this taken into account, it can be seen that the discussion above ranging from Expression (25) to Expression (30) applies to the case where time differential does not exist for Expression (37), i.e., where phase shift is dealt with.

FIGS. 34 and 35 show embodiments that allow for the problems discussed above. FIG. 34 is a block diagram of the fourth embodiment of the system in FIG. 17. The signal light from the optical transmitter 1 is sent over the single mode optical fiber SMF-1 to the phase conjugate light generator PC. The phase conjugate light generator 1 converts the received light into phase conjugate light for transmission over the single mode optical fiber SMF-2 to the optical receiver 5. Shown in the lower part of FIG. 34 is a power distribution pattern in the longitudinal direction (Z direction). Where the single mode optical fibers SMF-1 and SMF-2 are anomalous dispersion fibers, there occurs pulse compression in the signal light fed to the phase conjugate light generator PC. Thus if the mean intensity of light $|E_c(L)|^2$ downstream of the phase conjugate light generator PC were made the same as the initial intensity of light $|E_s(O)|^2$, the mean peak intensity of the pulse downstream of the phase conjugate light generator PC would become greater than the initial mean peak intensity. When $|E_c(L_1)|^2 < |E_s(o)|^2$, the optical Kerr effect in the single mode optical fiber SMF-2 is made as close to that in the single mode optical fiber SMF-1 as possible. This has been confirmed by experiments. In those experiments, the optical output of the optical transmitter 1 was set for 11 dBm and that of the phase conjugate light phase conjugate light generator PC for 5 dBm. Where normal dispersion fibers are used, pulse width is enlarged due to the synergistic effect of chromatic dispersion and SPM. This makes it desirable that $|E_c(L_1)|^2 > |E_s(O)|^2$. As with the case of using anomalous dispersion fibers, the setup where normal dispersion fibers are used is subject to the requirement that the mean peak power in each fiber be about the same.

FIG. 35 is a block diagram of the fifth embodiment of the system in FIG. 17. In this embodiment, the single mode optical fiber SMF-2 downstream of the phase conjugate light generator PC is divided into N part (N: natural number). The divided fibers SMF-21, SMF-22, . . . , SMF-2N receive progressively high levels of input intensity $|E_{cj}|^2$ (j=1, 2, . . . , N) so that the changes in mean intensity among the fibers will add up to be substantially symmetrical with respect to the intensity distribution in the longitudinal direction of the single mode optical fiber SMF-1. Being symmetrical means to satisfy Expressions (13) and (28). In the embodiment of FIG. 35, the single mode optical fiber SMF-1 may be divided into N parts, and the divided fiber parts may receive progressively high levels of input intensity. This arrangement causes the optical Kerr effect in the single mode optical fiber SMF-2 to become closer to the time-reversed optical Kerr effect in the single mode optical fiber SMF-1 so that chromatic dispersion and the optical Kerr effect will be compensated in the strict sense. Taking a larger dividing number N provides better symmetry and affords more effective compensation. Although the embodiment of FIG. 35 has a plurality of linear optical amplifiers halfway along the single mode optical fiber SMF-2, this is not limitative of the invention. Alternatively, a distributed optical amplifier setup may be used to prevent discontinuous changes of optical intensity in the optical transmission line. This kind of distributed constant optical amplifier is realized illustratively as follows: the single mode optical fiber SMF-2 connecting the phase conjugate light generator PC with the optical receiver 5 is doped beforehand with rare earth elements such as Er (erbium). In operation, the receiver 5 feeds the fiber with pumping light of a predetermined wavelength. In such a case, a continuous change may be applied to the doping density in the longitudinal direction of the single mode optical fiber. This varies the gain in the longitudinal direction and thereby ensures better symmetry. As another alternative, optical amplifiers utilizing nonlinear effects such as the Raman amplifier and Brillouin amplifier may be used.

FIG. 36 is a block diagram of an example to which the active control of polarized states is applied. In this example, the signal light from the single mode optical fiber SMF-1 enters a first port of an optical coupler 162. A second port of the optical coupler 162 receives pump light from a pump light source 166 via a polarization controller 168. The pump light is coupled to the signal light by the optical coupler 162 before entering a nonlinear medium 170. Phase conjugate light develops in the nonlinear medium 170 and is divided by an optical coupler 172. One part of the divided phase conjugate light is output onto the single mode optical fiber SMF-2. The other part of the divided phase conjugate light passes through an optical filter 174 to reach a photo detector 176. The photo detector 176 converts the received light into electric signals. A comparator 178 controls the polarized state of the pump light and the oscillation wavelength of the pump light source 166 so as to maximize the output level of the photo detector 176. The polarization controller 168 may be constituted by combining equivalents of λ/2 and λ/4 plates. The wavelength of the pump light may be controlled by adjusting the temperature and bias current of the laser diode used as the pump light source 166.

As described, the invention provides a novel optical communication system compensating for chromatic dispersion. The invention also provides a novel phase conjugate light generator applicable to that inventive system.

As many apparently different embodiments of this invention may be made without departing from the spirit and scope thereof, it is to be understood that the invention is not limited to the specific embodiments thereof except as defined in the appended claims.

What is claimed is:

1. A phase conjugate light generator, comprising:

an optical fiber providing a zero-dispersion at a first wavelength, the optical fiber having first and second ends;

a signal supply for supplying to the first end of the optical fiber an optical signal having an original phase; and a light source for outputting to the first end of the optical fiber a pumping light having a wavelength substantially equal to the first wavelength such that the phase of light travelling in the optical fiber is changed from the original phase and a phase conjugate light having a phase which is a conjugate of the original phase is emitted from the second end of the optical fiber.

2. A phase conjugate light generator according to claim 1, wherein the optical signal has wavelength which is different from the first wavelength.

3. A phase conjugate light generator according to claim 1, wherein the optical fiber is a single mode optical fiber.

4. A phase conjugate light generator according to claim 1, wherein the optical fiber provides a third order non-linear optical effect and generates the phase conjugate light through four-wave mixing.

5. A phase conjugate light generator according to claim 1, further comprising an optical band pass filter downstream from the second end of the optical fiber so that the phase conjugate light passes through the optical band pass filter.

6. A phase conjugate light generator according to claim 1, further comprising an optical amplifier downstream from the second end of the optical fiber, for amplifying the phase conjugate light.

7. A phase conjugate light generator according to claim 1, wherein the optical signal is composed of a plurality of signal light components multiplexed by frequency division multiplexing.

8. An optical communication system comprising:

a first single mode optical fiber transmission line for transmitting a first optical signal having an original phase;

a second single mode optical fiber transmission line; and an optical chromatic dispersion compensation device, comprising:

an optical fiber providing a zero-dispersion at a first wavelength, the optical fiber having first and second ends;

a first terminal for receiving the first optical signal from the first single mode optical fiber transmission line and for inputting the first optical signal to the first end of the optical fiber;

a light source for outputting to the first end of the optical fiber a pumping light having a wavelength substantially equal to the first wavelength such that the phase of light travelling in the optical fiber is changed from the original phase and a phase conjugate light having a phase which is a conjugate of the original phase is emitted from the second end of the optical fiber; and a second terminal for receiving from the second end of the optical fiber the phase conjugate light emitted from the second end of the optical fiber, the second terminal being coupled to the second signal mode optical fiber transmission line for outputting the phase conjugate light to the second single mode optical fiber transmission line for travel through the second single mode optical fiber transmission line.

9. An optical communication system according to claim 8, wherein the first and second single mode optical transmission lines have chromatic dispersion values which are substantially the same.

10. A phase conjugate light generator, comprising:

a non-linear optical medium;

a splitter for splitting an optical signal having an original phase into a first polarized component having a first polarization plane and a second polarized component having a second polarization plane perpendicular to the first polarization plane and supplying the first and second polarized components to the non-linear optical medium; and a light source for outputting to the non-linear optical medium a pumping light having a polarization plane substantially the same as one of the first and second polarization planes such that a phase conjugate light having a phase which is a conjugate of the original phase is generated in the non-linear optical medium.

11. A phase conjugate light generator according to claim 10, wherein the light source outputs first and second pumping light beams respectively having substantially the same polarization planes as the first and second polarization planes.

12. A phase conjugate light generator according to claim 10, wherein the non-linear optical medium comprises an optical fiber.

13. A phase conjugate light generator, comprising:

first and second non-linear optical mediums;

a splitter for splitting an optical signal having an original phase into a first polarized component having a first polarization plane and a second polarized component having a second polarization plane perpendicular to the first polarization plane and supplying the first and second polarized components respectively to the first and second non-linear optical mediums; and a light source for outputting to the first and second non-linear optical mediums first and second pumping light beams respectively having substantially the same polarization planes as the first and second polarization planes such that the optical signal is transformed in the first and second non-linear optical mediums and first and second phase conjugate light beams are respectively generated in the first and second non-linear optical mediums, the first and second phase conjugate light beams having a phase which is a conjugate of the original phase.

14. A phase conjugate light generator, comprising:

an optical fiber having first and second ends;

a splitter for splitting an optical signal having an original phase into a first polarized component having a first polarization plane and a second polarized component having a second polarization plane perpendicular to the first polarization plane and supplying the first and second polarized components respectively to the first and second ends of the optical fiber; and a light source for outputting to the first and second ends of the optical fiber first and second pumping light beams respectively having substantially the same polarization planes as the first and second polarization planes such that the first and second polarized components are transformed in the optical fiber into first and second phase conjugate light beams which are emitted from the second and first ends of the optical fiber, respectively, the first and second phase conjugate light beams having a phase which is a conjugate of the original phase.

15. A phase conjugate light generator according to claim 14, further comprising a polarized light controller provided on the optical fiber for maintaining the respective polarization planes of the first and second polarized components and the first and second pumping light beams travelling in the optical fiber.

16. A phase conjugate light generator according to claim 14, wherein the optical fiber is a polarization maintaining optical fiber.

17. A phase conjugate light generator, comprising:

a non-linear optical medium;

a signal supply for supplying to the non-linear optical medium an optical signal having an original phase; and a light source for outputting to the non-linear optical medium a pumping light having a polarization which is scrambled such that the optical signal is transformed in the non-linear optical medium and a phase conjugate light is generated in the non-linear optical medium, the phase conjugate light having a phase which is a conjugate of the original phase.

18. A phase conjugate light generator, comprising:

a non-linear optical medium;

a signal supply for supplying to the non-linear optical medium an optical signal saving a polarization which is scrambled and having an original phase; and a light source for outputting to the non-linear optical medium a pumping light such that the optical signal is transformed in the non-linear optical medium and a phase conjugate light is generated in the non-linear optical medium, the phase conjugate light having a phase which is a conjugate of the original phase.

19. An optical communication system, comprising:

a first optical fiber transmission line for transmitting an optical signal having an original phase;

a phase conjugate light generator for receiving the optical signal from the first optical fiber transmission line, transforming the optical signal and generating a phase conjugate light having a phase which is a conjugate of the original phase; and a second optical fiber transmission line for receiving the phase conjugate light from the phase conjugate light generator and transmitting the phase conjugate light, the first and second optical fiber transmission lines being selected so that the optical Kerr effect in the first optical fiber transmission line is substantially equal to the optical Kerr effect in the second optical fiber transmission line.

20. An optical communication system according to claim 19, wherein the first and second optical fiber transmission lines satisfy the following equation:

$$\frac{\omega_s n_{21} \overline{P_s} L_1}{A_{\mathit{eff}_1}} = \frac{\omega_c n_{22} \overline{P_c} L_2}{A_{\mathit{eff}_2}}$$

where $\omega_s$ and $\omega_c$ represent the optical frequencies of the optical signal and the phase conjugate light respectively, $n_{21}$ and $n_{22}$ represent the non-linear refractive indices of the first and second optical fiber transmission lines respectively, $L_1$ and $L_2$ represent the fiber lengths of the first and second optical fiber transmission lines respectively, $A_{\mathit{eff}_1}$ and $A_{\mathit{eff}_2}$ represent the effective core areas of the first and second optical fiber transmission lines respectively, and $\overline{P}_s$ and $\overline{P}_c$ represent the mean powers of the optical signal and the phase conjugate light respectively.

21. An optical communication system according to claim 20, wherein the first and second optical fiber transmission lines are selected so that the optical frequencies $\omega_s$ and $\omega_c$, the non-linear refractive indices $n_{21}$ and $n_{22}$, the fiber lengths $L_1$ and $L_2$, the effective core areas $A_{\mathit{eff}_1}$ and $A_{\mathit{eff}_2}$ and the mean powers $\overline{P}_s$ and $\overline{P}_c$ optimize compensation for chromatic dispersion.

22. An optical communication system according to claim 19, further comprising:

an optical transmitter, optically connected to the first optical fiber transmission line, for modulating the optical signal in accordance with an input signal; and an optical receiver, optically connected to the second optical fiber transmission line, for demodulating the phase conjugate light and producing a demodulated signal corresponding to the input signal.

23. An optical communication system according to claim 22, wherein the optical receiver includes a photo detector for converting the phase conjugate light into an electrical signal.

24. An optical communication system according to claim 22, wherein the optical receiver includes a local light source for outputting a local light to be coupled with the phase conjugate light, and a photo detector for converting the phase conjugate light and the local light into an electrical signal.

25. An optical communication system according to claim 19, further comprising:

an optical amplifier for amplifying the optical signal; and an optical band pass filter located downstream from the optical amplifier and upstream from the phase conjugate light generator for filtering the optical signal amplified by the optical amplifier before the optical signal reaches the phase conjugate generator.

26. An optical communication system according to claim 19, wherein:

the first and second optical fiber transmission lines have initial portions, the optical signal and the phase conjugate light have respective mean peak intensities, and the mean peak intensities are substantially the same in the initial portions of the first and second optical fiber transmission lines.

27. An optical communication system according to claim 19, wherein:

the optical signal and the phase conjugate light have intensity distributions respectively in longitudinal directions of the first and second optical fiber transmission lines, and the intensity distributions of the optical signal and the phase conjugate light are substantially symmetrical.

28. An optical communication system according to claim 27, further comprising a plurality of optical amplifiers provided along the second optical fiber transmission line for amplifying the phase conjugate light transmitted on the second optical fiber transmission line.

29. A phase conjugate light generator, comprising:

a first optical fiber transmission line for transmitting an optical signal having an original phase;

a phase conjugate light generator comprising:

a non-linear optical medium connected to the first optical fiber transmission line to receive the optical signal, and a light source for outputting to the non-linear optical medium a pumping light so that the optical signal is transformed in the non-linear optical medium and a phase conjugate light is generated in the non-linear optical medium, the phase conjugate light having phase which is a conjugate of the original phase, a second optical fiber transmission line for receiving the phase conjugate light from the phase conjugate light generator and transmitting the phase conjugate light, the first and second optical fiber transmission lines being selected so that the optical Kerr effect in the first optical fiber transmission line is substantially equal to the optical Kerr effect in the second optical fiber transmission line.

30. A phase conjugate light generator according to claim 29, wherein the first and second optical fiber transmission lines are selected to approximately satisfy the following equation:

$$\frac{\omega_s n_{21} \overline{P_s} L_1}{A_{\text{eff}_1}} = \frac{\omega_c n_{22} \overline{P_c} L_2}{A_{\text{eff}_2}}$$

where $\omega_s$ and $\omega_c$ represent the optical frequencies of the optical signal and the phase conjugate light respectively, $n_{21}$ and $n_{22}$ represent the non-linear refractive indices of the first and second optical fiber transmission lines respectively, $L_1$ and $L_2$ represent the fiber lengths of the first and second optical fiber transmission lines respectively, $A_{\text{eff}_1}$ and $A_{\text{eff}_2}$ represent the effective core areas of the first and second optical fiber transmission lines respectively, and $\overline{P_s}$ and $\overline{P_c}$ represent the mean powers of the optical signal and the phase conjugate light respectively.

31. A phase conjugate light generator according to claim 30, wherein the first and second optical fiber transmission lines are selected so that the optical frequencies $\omega_s$ and $\omega_c$, the non-linear refractive indices $n_{21}$ and $n_{22}$, the fiber lengths $L_1$ and $L_2$, the effective core areas $A_{\text{eff}_1}$ and $A_{\text{eff}_2}$ and the mean powers $\overline{P_s}$ and $\overline{P_c}$ optimize compensation for chromatic dispersion.

32. A phase conjugate light generator according to claim 29, wherein the second optical fiber transmission line acts as an optical compensation device.

33. An optical compensation apparatus, optically connected to a first optical fiber transmission line for receiving an optical signal having an original phase from the first optical fiber transmission line, comprising:

a phase conjugate light generator for receiving the optical signal, transforming the optical signal and generating a phase conjugate light having a phase which is a conjugate of the original phase; and a second optical fiber transmission line for receiving the phase conjugate light from the phase conjugate light generator and transmitting the phase conjugate light, the second optical fiber transmission line being selected so that the optical Kerr effect in the second optical fiber transmission line is substantially equal to the optical Kerr effect in the first optical fiber transmission line.

34. An optical compensation apparatus according to claim 33, wherein the first and second optical fiber transmission lines satisfy the following equation:

$$\frac{\omega_s n_{21} \overline{P_s} L_1}{A_{\text{eff}_1}} = \frac{\omega_c n_{22} \overline{P_c} L_2}{A_{\text{eff}_2}}$$

where $\omega_s$ and $\omega_c$ represent the optical frequencies of the optical signal and the phase conjugate light respectively, $n_{21}$ and $n_{22}$ represent the non-linear refractive indices of the first and second optical fiber transmission lines respectively, $L_1$ and $L_2$ represent the fiber lengths of the first and second optical fiber transmission lines respectively, $A_{\text{eff}_1}$ and $A_{\text{eff}_2}$ represent the effective core areas of the first and second optical fiber transmission lines respectively, and $\overline{P_s}$ and $\overline{P_c}$ represent the mean powers of the optical signal and the phase conjugate light respectively.

35. An optical compensation apparatus according to claim 34, wherein the second optical fiber transmission line is selected so that the optical frequencies $\omega_s$ and $\omega_c$, the non-linear refractive indices $n_{21}$ and $n_{22}$, the fiber lengths $L_1$ and $L_2$, the effective core areas $A_{\text{eff}_1}$ and $A_{\text{eff}_2}$ and the mean powers $\overline{P_s}$ and $\overline{P_c}$ optimize compensation for chromatic dispersion.

36. An optical compensation apparatus for supplying a phase conjugate light to a second optical fiber transmission line, comprising:

a first optical fiber transmission line for transmitting an optical signal having an original phase, the first optical fiber transmission line being selected so that the optical Kerr effect in the first optical fiber transmission line is substantially equal to the optical Kerr effect in the second optical fiber transmission line;

a phase conjugate light generator for receiving the optical signal from the first optical fiber transmission line, transforming the optical signal and generating the phase conjugate light, the phase conjugate light having a phase which is a conjugate of the original phase.

37. An optical compensation apparatus according to claim 36, wherein the first and second optical fiber transmission lines satisfy the following equation:

$$\frac{\omega_s n_{21} \bar{P}_s L_1}{A_{\mathit{eff}_1}} = \frac{\omega_c n_{22} \bar{P}_c L_2}{A_{\mathit{eff}_2}}$$

where $\omega_s$ and $\omega_c$ represent the optical frequencies of the optical signal and the phase conjugate light respectively, $n_{21}$ and $n_{22}$ represent the non-linear refractive indices of the first and second optical fiber transmission lines respectively, $L_1$ and $L_2$ represent the fiber lengths of the first and second optical fiber transmission lines respectively, $A_{\mathit{eff}1}$ and $A_{\mathit{eff}2}$ represent the effective core areas of the first and second optical fiber transmission lines respectively, and $\bar{P}_s$ and $\bar{P}_c$ represent the mean powers of the optical signal and the phase conjugate light respectively.

38. An optical compensation apparatus according to claim 37, wherein the first optical fiber transmission line is selected so that the optical frequencies $\omega_s$ and $\omega_c$, the non-linear refractive indices $n_{21}$ and $n_{22}$, the fiber lengths $L_1$ and $L_2$, the effective core areas $A_{\mathit{eff}1}$ and $A_{\mathit{eff}2}$ and the mean powers $\bar{P}_s$ and $\bar{P}_c$ optimize compensation for chromatic dispersion.

39. A phase conjugate light generator, comprising:

a non-linear optical medium;

a signal supply for supplying to the non-linear optical medium an optical signal having an original phase and comprising a first optical signal pulse train; and a light source for outputting to the non-linear optical medium a pumping light pulse train synchronized with the first optical signal pulse train such that the optical signal is transformed in the non-linear optical medium and a phase conjugate light is generated in the non-linear optical medium, the phase conjugate light having a phase which is a conjugate of the original phase, the phase conjugate light comprising a second optical signal pulse train synchronized with the first optical signal pulse train and the pumping light pulse train.

40. An optical compensation apparatus, comprising:

a non-linear optical medium;

a signal supply for supplying to the non-linear optical medium an optical signal having an original phase and comprising a first optical signal pulse train; and a light source for outputting to the non-linear optical medium a pumping light pulse train having a pumping pulse width, the pumping light pulse train being synchronized with the optical signal pulse train such that the optical signal is transformed in the non-linear optical medium and a phase conjugate light is generated in the non-linear optical medium, the phase conjugate light having a phase which is a conjugate of the original phase, the phase conjugate light comprising a second optical signal pulse train synchronized with the first optical signal pulse train and the pumping light pulse train, the second optical signal pulse train having a pulse width and the pumping pulse width being selected to control the pulse width of the second optical signal pulse train.

41. An optical communication system, comprising:

a first optical fiber transmission line for transmitting an optical signal having an original phase and comprising a first optical signal pulse train; and an optical compensation device including:

a non-linear optical medium connected to the first optical fiber transmission line to receive the optical signal;

a light source for outputting to the non-linear optical medium a pumping light pulse train synchronized with the first optical signal pulse train such that the optical signal is transformed in the non-linear optical medium and a phase conjugate light is generated in the non-linear optical medium, the phase conjugate light having a phase which is a conjugate of the original phase, the phase conjugate light comprising a second optical signal pulse train synchronized with the first optical signal pulse train and the pumping light pulse train; and a second optical fiber transmission line for receiving the phase conjugate light from the non-linear optical medium and for transmitting the phase conjugate light.

42. An optical communication system according to claim 40, wherein the pumping light pulse train has a narrower pulse width than the first optical signal pulse train whereby the second optical signal pulse train is effectively reshaped.

43. An optical communication system according to claim 41, wherein the pumping pulse train is in a Return to Zero signal encoding format.

44. An optical communication system according to claim 43, wherein the first optical signal pulse train is in a Non Return to Zero signal encoding format.

45. An optical communication system according to claim 43, wherein the first optical signal pulse train is in a Return to Zero signal encoding format.

46. An optical communication system according to claim 43, wherein the first optical signal pulse train comprises a soliton pulse train.

47. An optical communication system according to claim 41, wherein the pumping light pulse train comprises a soliton pulse train.

48. A phase conjugate light generator, comprising:

an optical fiber having first and second ends;

a signal supply for supplying to the first end of the optical fiber an optical signal having an original phase;

a light source for outputting to the first end of the optical fiber a pumping light modulated by a low frequency such that the phase of light travelling in the optical fiber is changed from the original phase and phase conjugate light have a phase which is a conjugate of the original phase is emitted from the second end of the optical fiber.

49. A phase conjugate light generator according to claim 48, wherein the optical fiber provides a zero dispersion at a first wavelength, and the pumping light has a wavelength substantially equal to the first wavelength.

50. A phase conjugate light generator according to claim 48, wherein the low frequency signal used for modulating the pumping light has a frequency in the range of from 10 kHz to 1 MHz.

* * * * *